US 9,287,956 B2

(12) United States Patent
Campos et al.

(10) Patent No.: US 9,287,956 B2
(45) Date of Patent: *Mar. 15, 2016

(54) MULTIPLE-INPUT MULTIPLE-OUTPUT (MIMO) COMMUNICATION SYSTEM

(71) Applicant: Cable Television Laboratories, Inc., Louisville, CO (US)

(72) Inventors: Luis Alberto Campos, Superior, CO (US); Jennifer Andreoli-Fang, Boulder, CO (US); Joey Padden, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/181,641

(22) Filed: Feb. 15, 2014

(65) Prior Publication Data
US 2014/0233672 A1  Aug. 21, 2014

Related U.S. Application Data

(63) Continuation-in-part of application No. 13/769,288, filed on Feb. 16, 2013, now Pat. No. 9,088,313.

(60) Provisional application No. 61/845,340, filed on Jul. 11, 2013.

(51) Int. Cl.
*H04B 7/06* (2006.01)
*H04B 7/02* (2006.01)
*H04B 7/04* (2006.01)

(52) U.S. Cl.
CPC ............. *H04B 7/0617* (2013.01); *H04B 7/022* (2013.01); *H04B 7/0413* (2013.01); *H04B 7/068* (2013.01)

(58) Field of Classification Search
CPC ..... H01B 12/006; H04B 7/022; H04B 7/0413; H04B 7/068; H04B 7/0617
USPC ............... 455/501, 504, 505, 507, 78, 82, 83, 455/550.1, 562.1, 101; 375/267, 295; 398/77, 79, 115
See application file for complete search history.

(56) References Cited

U.S. PATENT DOCUMENTS

| 5,185,763 A | 2/1993 | Krishnan |
| 5,504,783 A | 4/1996 | Tomisato et al. |
| 5,561,686 A | 10/1996 | Kobayashi et al. |
| 5,749,857 A | 5/1998 | Cuppy |

(Continued)

FOREIGN PATENT DOCUMENTS

| WO | 2005/062498 | 7/2005 |
| WO | 2011/161637 | 12/2011 |

OTHER PUBLICATIONS

International Search Report (ISR) and Written Opinion of corresponding PCT application.

*Primary Examiner* — Thanh Le
(74) *Attorney, Agent, or Firm* — Great Lakes Intellectual Property, PLLC.

(57) ABSTRACT

A multiple-input multiple-output (MIMO) capable system is contemplated. The communication system may include a signal processor configured to separate an input stream into multiple signal paths to facilitate simultaneous transport through a communication medium. The capability to simultaneously transmit multiples signal paths may be beneficial in order to maximize throughput and/or minimize expense.

20 Claims, 12 Drawing Sheets

(56) References Cited

U.S. PATENT DOCUMENTS

| | | |
|---|---|---|
| 6,941,079 B1 | 9/2005 | Barozzi et al. |
| 6,944,120 B2 | 9/2005 | Wu et al. |
| 7,116,906 B2 * | 10/2006 | Volpi et al. ............... 398/77 |
| 7,391,832 B2 | 6/2008 | Catreux-Erces et al. |
| 8,223,872 B1 | 7/2012 | Zhang |
| 8,548,330 B2 * | 10/2013 | Berlin et al. ............... 398/115 |
| 8,744,504 B2 * | 6/2014 | Faccin et al. ............... 455/507 |
| 2002/0122398 A1 | 9/2002 | Jou |
| 2002/0126338 A1 | 9/2002 | Volpi et al. |
| 2004/0037565 A1 | 2/2004 | Young et al. |
| 2005/0063340 A1 | 3/2005 | Hoffmann |
| 2005/0105632 A1 | 5/2005 | Catreux-Erces et al. |
| 2005/0174935 A1 | 8/2005 | Segel |
| 2006/0234663 A1 | 10/2006 | Wilhoyte |
| 2007/0032220 A1 | 2/2007 | Feher |
| 2007/0054625 A1 | 3/2007 | Beale |
| 2009/0028192 A1 | 1/2009 | Rieger et al. |
| 2009/0204877 A1 | 8/2009 | Betts |
| 2010/0035600 A1 | 2/2010 | Hou et al. |
| 2011/0019723 A1 | 1/2011 | Lerner |
| 2011/0080979 A1 | 4/2011 | Duggan |
| 2011/0243025 A1 | 10/2011 | Kim |
| 2012/0206285 A1 | 8/2012 | Khlat |
| 2012/0236971 A1 | 9/2012 | Taghavi Nasrabadi et al. |
| 2012/0281621 A1 | 11/2012 | Lotfallah |
| 2012/0331111 A1 | 12/2012 | Wu et al. |
| 2013/0016966 A1 | 1/2013 | Jansen et al. |
| 2013/0076566 A1 | 3/2013 | Jiang et al. |
| 2013/0201316 A1 | 8/2013 | Binder et al. |
| 2013/0215833 A1 | 8/2013 | Ong et al. |
| 2013/0216228 A1 | 8/2013 | Nazarathy et al. |
| 2013/0308950 A1 | 11/2013 | Blouza et al. |
| 2014/0066098 A1 | 3/2014 | Stern et al. |
| 2014/0177745 A1 | 6/2014 | Krishnamurthy et al. |
| 2014/0206367 A1 | 7/2014 | Agee et al. |
| 2014/0219267 A1 | 8/2014 | Eyuboglu et al. |
| 2014/0233678 A1 | 8/2014 | Campos et al. |
| 2014/0241446 A1 | 8/2014 | Zhang et al. |
| 2014/0270776 A1 | 9/2014 | Jinno et al. |
| 2014/0294393 A1 | 10/2014 | Lowery et al. |
| 2014/0302802 A1 | 10/2014 | Chang et al. |
| 2014/0321565 A1 | 10/2014 | Campos et al. |
| 2014/0342659 A1 | 11/2014 | Maharajh et al. |
| 2015/0038185 A1 * | 2/2015 | Saban et al. ............... 455/509 |

* cited by examiner

MULTIPLE-INPUT MULTIPLE-OUTPUT (MIMO) COMMUNICATION SYSTEM

CROSS-REFERENCE TO RELATED APPLICATIONS

This application is a continuation-in-part of U.S. application Ser. No. 13/769,288, filed Feb. 16, 2013, and claims the benefit of U.S. provisional application No. 61/845,340 filed Jul. 11, 2013, the disclosures of which are incorporated in their entirety by reference herein.

TECHNICAL FIELD

The present invention relates to communication systems and signal processors, such as but not necessarily limited to those capable of facilitating multiple-input multiple-output (MIMO) or multipath communications.

BACKGROUND

Wireless communications systems may employ multiple-input multiple-output (MIMO) techniques to facilitate multipath communications. The multipath capabilities of MIMO systems allow data to be transmitted simultaneously over multiple paths between a plurality of transmitting devices and a plurality of receiving devices to effectively increase capacity over single path systems.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
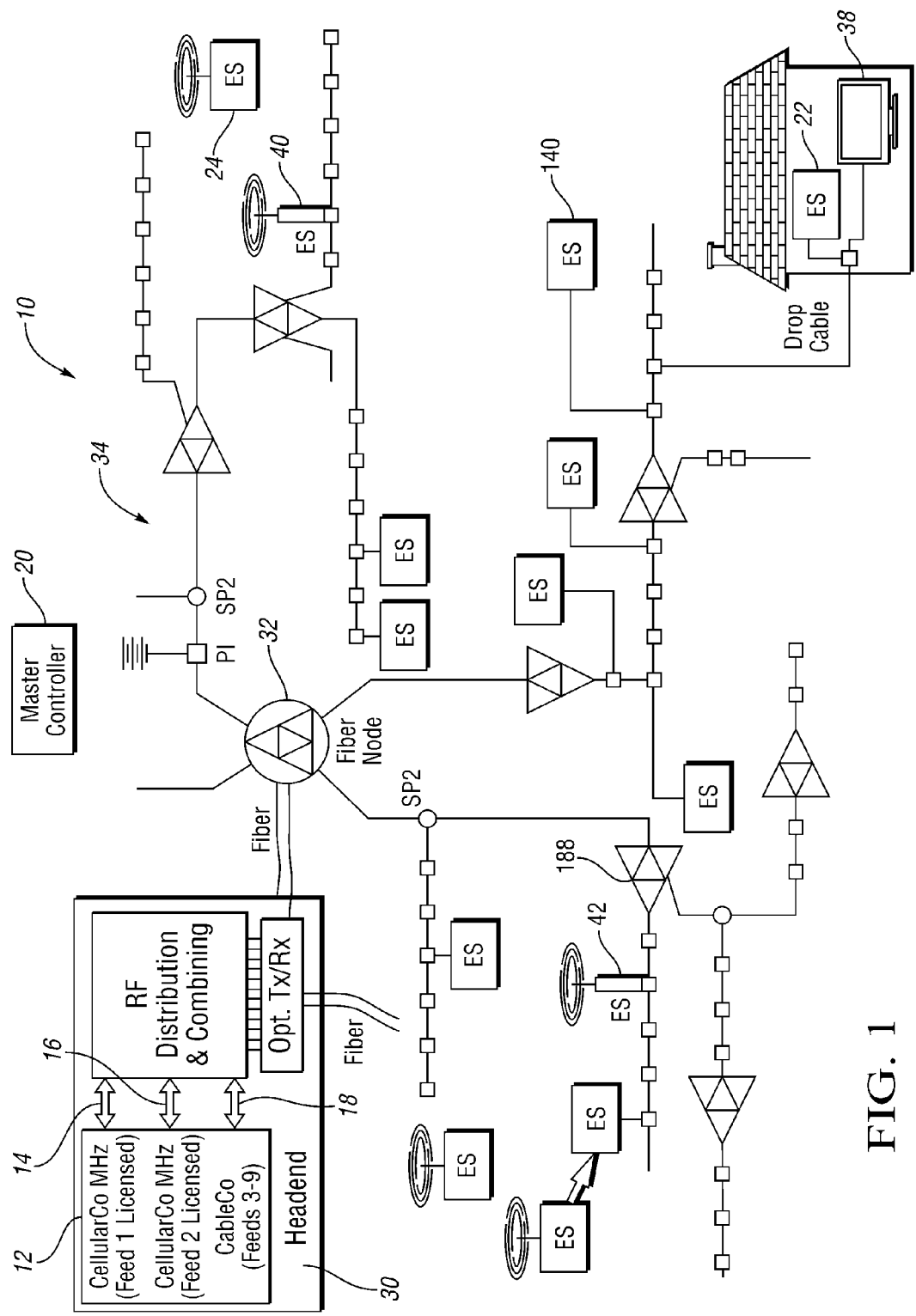
FIG. 1 illustrates a multiple-input multiple-output (MIMO) communication system in accordance with one non-limiting aspect of the present invention.

FIG. 1 illustrates a multiple input multiple output (MIMO) communication system 10 in accordance with one non-limiting aspect of the present invention. The system 10 may be configured to facilitate electronic signaling between a signal processor 12 and one or more end stations (ES), user equipment (UE), access points (APs), terminals or other devices. The signal processor 12 may be configured to facilitate transport of virtually any type of signaling, including signaling associated with a multiple system operator (MSO), such as but not necessarily limited to a cable, satellite, or broadcast television service provider, a cellular service provider, and high-speed data service provider, an Internet service provider (ISP), etc. The communication system 10 is illustrated with respect to the signal processor 12 supporting a first feed 14, a second feed 16, a third feed 18 (representing seven independent feeds), although more or less feeds may be received for transport. Each feed 14, 16, 18 may include data communicated to the signal processor 12 from a local or remote sourcing device/entity as a baseband or other suitable signal. Each feed may be processed for transport with the signal processor 12, optionally with the signal processor 12 comprising separate or independent signal processors for each feed. The first and second feeds 14, 16 may be associated with cellular related signaling (e.g., signaling associated with a cellular phone call) and the third feed 18 may be associated with cable related signaling (e.g., signaling associated with delivery of a television program and/or Internet data download). A master controller 20 may be included as a standalone component and/or integrated into one of the illustrated components in order to facilitate the operations contemplated herein.

The end stations ES correspond with any electronically operable device having capabilities sufficient to facilitate directly or indirectly interfacing a user with signaling transported through the communication system 10. The end stations ES may be a gateway, a router, a computer, a mobile phone, a cellular phone, a media terminal adapter (MTA), a voice over Internet protocol (VoIP) enabled device, a television, a set top box (STB), network address translator (NAT), etc. For exemplary non-limiting purposes, a first end station 22 is shown to be a wireline type of device, such as a home gateway or set-top box configured to output signaling to a television or other device through a wireless and/or wired connection, and a second end station 24 is shown to be a wireless type of device, such as a remote antenna unit, wireless computer, television or cellular phone, optionally having capabilities sufficient to interface signaling using a wireless and/or a wired connection. The use of such first and second end stations 22, 24 may be beneficial in facilitating continued access to a television program while a user travels between locations associated with the first and second ends stations 22, 24. Seamless access to the content may be provided in this manner using different ends stations or capabilities of the end stations, e.g., a wireless capability of the second end station 24 may be used when at one location and a wireline capability of the first end station 22 may be used when at another location.

The present invention contemplates distinguishing between wireless and wireline communications. The wireline communications may correspond with any type of electronic signal exchange where a wire, a coaxial cable, a fiber or other bound medium is used to facilitate or otherwise direct at least a portion of the related signaling, including the signaling exchanged outside of the communicating device/processor. The wireline communications include but are not necessarily limited to those carried at least partially over a fiber/cable backbone associated with a cable television distribution system or an Internet or non-Internet based data communication system. The wireless communications may correspond with any type of electronic signal exchange where an antenna, antenna port or other transmitting type of device is used to communicate at least a portion of the signaling as radio frequency (RF) signals, such as over a wireless link or through an unbound or air medium, optionally in the manner described in U.S. patent application serial number. The wireless communications include but are not necessary limited to satellite communications, cellular communications and Wi-Fi communications. The use of wireline and wireless communications and the corresponding mediums are not intended to limit the present invention to any particular type of medium, protocol, or standard and is instead noted to differentiate between two types of communications, e.g., bound and unbound.

The signaling desired for transports through the communication system 10 may be received at a headend unit 30 associated with the signal processor 12 and thereafter carried by one or more fibers to a fiber node 32, such as the manner described in U.S. patent application Ser. No. 14/181,640, entitled Multiple-Input-Multiple-Output (MIMO) Communication System, filed Feb. 15, 2014, the disclosure of which is hereby incorporated by reference in its entirety. The fiber node 32 may be part of a cable television distribution system 34 from which a plurality of coaxial cables may facilitate further delivery to different geographical areas, optionally with use of splitters and/or amplifiers. The coaxial cables are shown to include a plurality of taps (shown as rectangles) through which various end stations ES may be connected to receive the wireline signaling and/or other signaling associated with the headend, e.g., signaling associated with other types of content and/or data transmissions. The first end station 22 is shown to be connected to one of the taps to facilitate interfacing transported signals to a locally connected, first user equipment (UE) 38. Using LTE over HFC, communications between end station 22 and UE 38 can take place through the signal processor 12 but not directly. Communications between end station 22 and UE 38 can take place directly if other means of communications are used such as WiFi or MoCA or Ethernet. Communications between end station 22 and UE 38 can also take place using LTE over HFC but over a separate system where end station 22 also has signal processor functionality and the UE 38 functions as an end station of this local "home LTE over HFC network". The first end station 22 may be configured to facilitate processing of frequency diverse signals for wireline and/or wireless communication to the UE 38, which is shown to be a television but could be any other type of device, such as a mobile phone, tablet, etc. having capabilities sufficient to access television or data signaling using one or both of a wired and wireless connection. The first end station 22 may be configured to facilitate interfacing transported signals with the first UE 38 by converting frequency diverse signaling to an output signaling stream usable by the UE 38.

A third end station 40 is shown to be configured to facilitate wirelessly signaling with the second end station 24. The third end station 40 may be configured to convert the frequency diverse signals carried over the wireline distribution system 34 to spatially diverse signals or other suitable types of RF signals. The third end station 40 may be included as part of a Wi-Fi access point, a router, a cellular tower, a base station, etc. The ability of the third end station 40 to output wireless signaling may be beneficial if licensing or other restrictions limit how the wireless signals can be transmitted from the third end station 40, e.g., frequency usage restrictions may prevent output of the frequency diverse signals carried over the distribution system 34 to the second end station 24 without being pre-processed by the third end station 40. The third end station 40 may be configured to pre-process the frequency diverse signals carried over the distribution system 34 to suitable wireless signals having other frequency characteristics licensed for use with the second end station 24.

The third end station 40 may be configured to convert received wireline signaling to wireless signaling suitable to any restrictions associated with the second end station 24. The third end station 40 may be useful in allowing a user to access content through different types of devices and/or to facilitate use of other wireless transmission frequencies and communication mediums. The third end station 40 may be configured to facilitate output of spatially diverse signals according to frequency ranges allocated to an originator of the corresponding signaling stream. The second end station 24 may be a handset, mobile phone or other device having capabilities sufficient to process spatially diverse signaling, such as to facilitate interfacing a cellular phone call with the user (additional processing may be done at the second end station 24 to facilitate the phone call or other operation desired for the signaling stream). A fourth end station 42 may be configured to facilitate wirelessly interfacing transported signaling with the second end station 24, such as to enhance spatial diversity of the interfaced wireless signal in the manner described below in more detail.

Figure 2A:
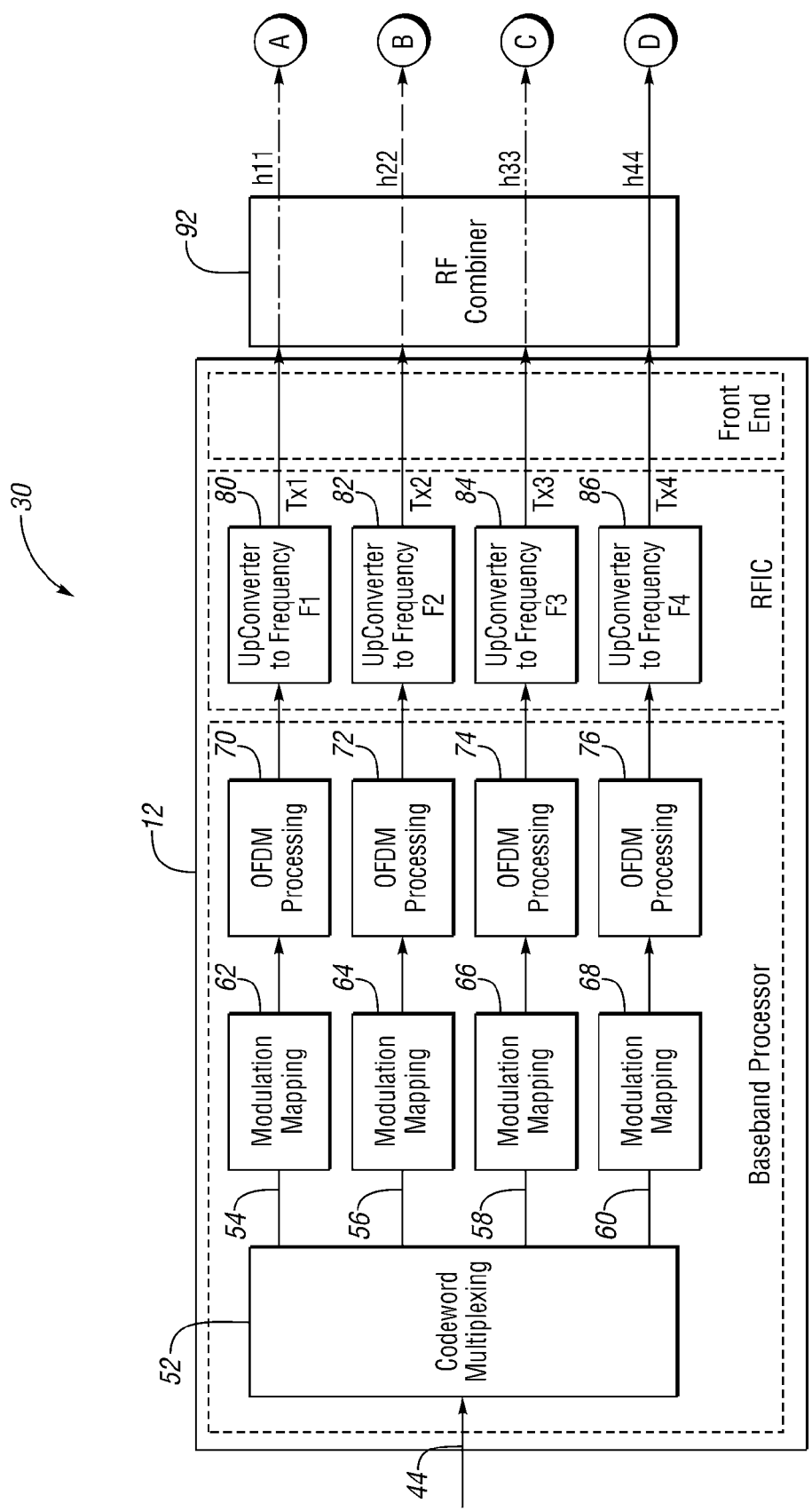
FIGS. 2a-2b schematically illustrate operation of the communication system when facilitating a wireline signaling mode in accordance with one non-limiting aspect of the present invention.
Figure 2B:
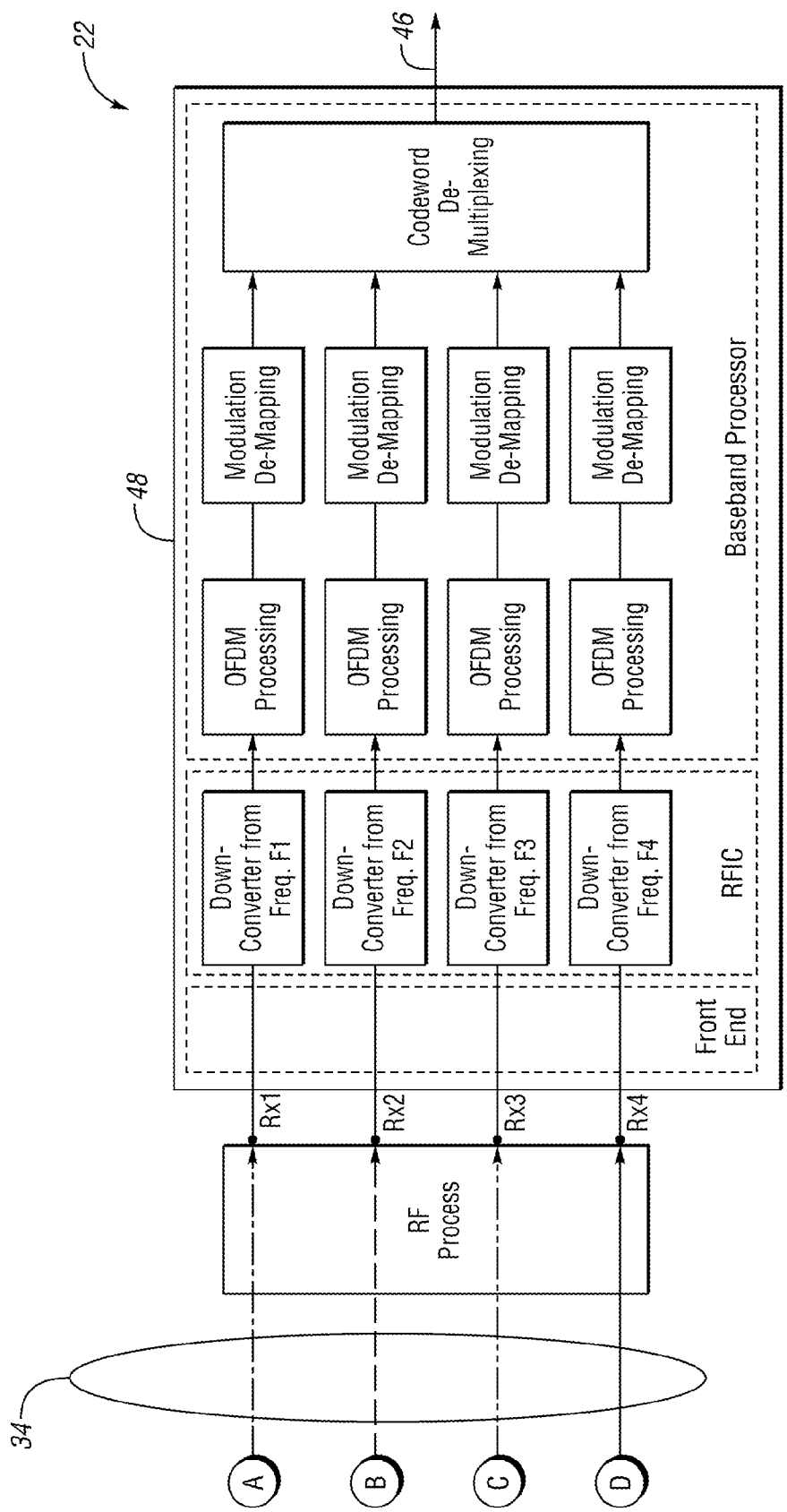

FIGS. 2a-2b schematically illustrate operation of the communication system 10 when facilitating a wireline signaling mode in accordance with one non-limiting aspect of the present invention. The wireline signaling mode corresponds with the signal processor 12 receiving an input signal 44, processing the input signal for transmission over at least a portion of the wireline communication medium 34, and the first end station 22 processing the transmitted signaling into an output signal 46. The output signal 46 may be subsequently transmitted to the first UE 38 or other device for final use. The signal processor 12 may be configured to receive the input signal from a base station, eNodeB, signal processor or other processing element desiring to transport signaling over the communication system (e.g., one of the feeds 14, 16, 18). The base station may be associated with an Internet service provider, a cable television sourcing entity, cellular phone provider or other source capable of providing data to the signal processor 12 for transport. The input signal 44 may be in the form of a baseband signal, a non-continuous wave (CW) type of signal and/or some other signaling/streaming sufficient to represent data, e.g. data represented using binary data bits/bytes and varying voltages or optical intensities. Optionally, the input signal 44 may be a non-diverse signal at least in that the data is carried within a single stream/signal as opposed to being divided for transmission using frequency diverse signaling and/or spatially diverse signaling.

The communication system 10 may be configured to facilitate transport of the input signal 44 (input data, message, video, audio, etc.) from an originating address associated with the sourcing entity to a destination address associated with the first UE 38 (or other end station). The present invention contemplates the signal processor 12 being configured to convert the input signal 44 to an intermediary signal prior to providing long-haul transport of the intermediary signal over one or more of the contemplated communication mediums so that the intermediary signal can be re-processed with another signal processor, such as with a signal processor 48 of the first end station 22 that converts the intermediary signal to the output signal 46, e.g., in the manner described in U.S. patent application Ser. No. 14/181,643, entitled Multiple-Input-Multiple-Output (MIMO) Communication System, filed Feb. 15, 2014, the disclosure of which is hereby incorporated by reference in its entirety. In this manner, the output signal 46 may take the same form as the input signal 44 prior to being processed with the first signal processor 12. Optionally, the second signal processor 48 may be configured to generate the output signal 46 as a different type of signal. The signal 46 as it comes out of signal processor 48 may not be frequency or spatially diverse, e.g., signal 46 may need another processor like 12 to regenerate back spatial or frequency diverse signals. This would most likely be to implement a home "LTE over HFC" network that extends from the larger coverage LTE over HFC access network. Another way of extending frequency or spatially diverse signals may include using an end station similar to end station 40 and converting to spatially or frequency diverse signals without use of a signal processor similar to the processor 48. The second signal processor 48 may be configured to assess the signaling capabilities of the first UE 38 and to adjust the characteristics of the output signal 46 to operate with the capabilities of the first UE 38.

The first signal processor 12 may include a codeword multiplexing device 52. The codeword multiplexing device 52 may be configured to multiplex the input signal 44 into a plurality of signal parts 54, 56, 58, 60. The codeword multiplexing device 52 is shown to be configured for non-limiting purposes to multiplex the input signal 44 into a first signal part 54, a second signal part 56, a third signal part 58 and a fourth signal part 60. The codeword multiplexer 52 may be configured to facilitate encoding the signal parts 54, 56, 58, 60 in/with codewords in order to enable additional robustness through addition of parity information. The codeword multiplexing device 52 may add extra bits to each signal part 54, 56, 58, 60 to increase robustness and the capability to reconstruct the original signal in case bits from one or more of the signaling parts 54, 56, 58, 60 are lost during communication. In a very benign environment, processing provided by the codeword multiplexing device 52 may be foregone, however, many applications, and in particular in MIMO, may practically require the additional robustness provided with the codewords. The use of four signal parts 54, 56, 58, 60 is believed to be beneficial as the particular implementation contemplates facilitating MIMO operations where the split parts correspond to four independent antenna ports. The codeword multiplexing device 52 may be configured to divide the input signal 44 into each of the signal parts 54, 56, 58, 60 such that each signal part 54, 56, 58, 60 carries at least a different portion of the input signal 44.

The signal processor 12 may include a plurality of modulation mapping devices 62, 64, 66, 68. The modulation mapping devices 62, 64, 66, 68 may be configured to format a received one of the first, second, third and fourth signal parts 54, 56, 58, 60 with respect to a constellation symbol. The mapping devices 62, 64, 66, 68, for example, may take a digital stream and convert that information into coordinate values defining different constellation symbols. The constellation symbols may correspond with a transport mechanism used within the communication system 10 to facilitate scheduling long-haul transmissions over the wireline communication 34, such as the constellation symbols associated with the MAP disclosed in U.S. patent application Ser. No. 12/954,079, the disclosure of which is hereby incorporated by reference in its entirety. In this manner, the modulation mapping devices 62, 64, 66, 68 may be configured to facilitate manipulating the data received from the codeword multiplexer 52 for actual transmission within the system 10. The modulation mapping devices 62, 64, 66, 68 may be configured to map or otherwise associate the bits/bytes output from the codeword multiplexer 52 with particular time periods and/or frequencies or other coordinates associated with transmission through the communication medium 34.

The signal processor 12 may include a plurality of orthogonal frequency division multiplexing (OFDM) processing devices 70, 72, 74, 76 (even though OFDM processing devices are included here as an example, other type of multicarrier or single carrier processing devices may be used). The OFDM processing devices 70, 72, 74, 76 may be configured to facilitate transmission of the received one of the first, second, third and fourth signal parts 54, 56, 58, 60 over a plurality of subcarriers. The OFDM processing devices 70, 72, 74, 76 may be configured to facilitate transmitting each signal part 54, 56, 58, 60 using an independent one of multiple narrowband subcarriers. The constellation symbol resulting from the modulation mapping devices 62, 64, 66, 68 may be used to define a plurality of values to which the particular subcarriers may be mapped. The use of multiple narrowband subcarriers may be beneficial in certain radio frequency environments compared to a single wideband carrier implementation. In principle, wideband carriers can also be used to carry frequency or spatially diverse information, however, the example of multiple narrowband subcarriers is used based on the likely environmental characteristics allowing it to provide better performance. The OFDM processing devices 70, 72, 74, 76 may be configured to translate a theoretical mapping provided by the modulation mapping devices 62, 64, 66, 68 for each signal part 54, 56, 58, 60 into actual signaling streams (spectrum) having specific parameters that will govern how the corresponding signals are actually transmitted beyond the signal processor 12. In this manner, the OFDM processing devices 70, 72, 74, 76 may be configured to map binary representations associated with the modulation mapping devices 62, 64, 66, 68 to the actual spectrum (e.g., signals received by the converter devices 80, 82, 84, 86).

The signal processor 12 may include a plurality of converter devices 80, 82, 84, 86. The converter devices 80, 82, 84, 86 may be configured to convert signaling associated with a received one of the first, second, third and fourth signal parts 54, 56, 58, 60 from a received frequency to a desired output frequency. The converter devices 80, 82, 84, 86 are shown to convert each of the first, second, third and fourth signal parts 54, 56, 58, 60 to a different frequency, which are correspondingly illustrated as a first frequency (F1), a second frequency (F2), a third frequency (F3) and a fourth frequency (F4). The conversion of each signal part 54, 56, 58, 60 output from the codeword multiplexing device 52 into a different frequency may be useful in providing frequency diversity. The frequency diversity enable the simultaneous transmission of multiple frequency multiplexed signals over medium 34, and thereby may allow more data to be transmitted than multiple spatially multiplexed signals over medium 110. Almost ideal or true orthogonality or diversity may be achieved over the HFC environment while spatial diversity over the wireless medium is not as efficient.

Figure 3:
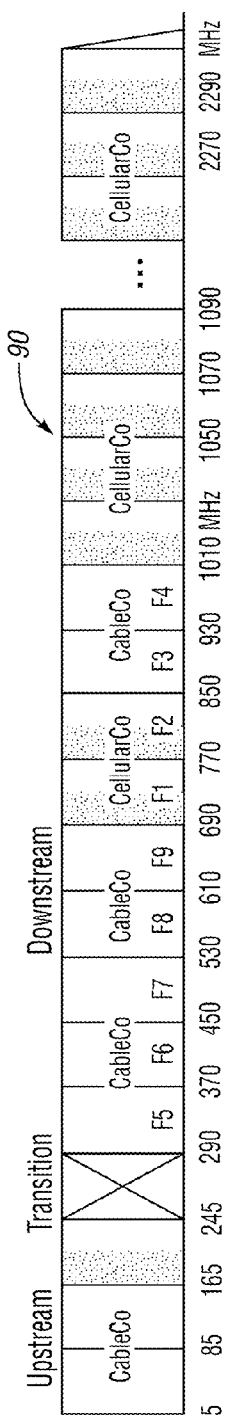
FIG. 3 illustrates a frequency selection map in accordance with one non-limiting aspect of the present invention.

FIG. 3 illustrates a frequency selection map 90 in accordance with one non-limiting aspect of the present invention. The frequency conversion map 90 may be used to facilitate selection of the frequency conversion performed with the signal processor converters 80, 82, 84, 86. The frequency selection map 90 may include a plurality of frequency intervals assigned to facilitate upstream and downstream transmissions within the communication medium 34. An additional interval of frequencies may be set aside as a transition boundary between upstream and downstream related frequencies in order to prevent fall off or other interferences between the upstream/downstream frequencies. The mapping table is shown to include a feed reference (F1, F2, F3, F4, F5, F6, F7, F8, and F9) within each one of the downstream intervals in order to illustrate certain frequency ranges set aside for particular feeds 14, 16, 18. One non-limiting configuration of the communication system 10 contemplates nine feeds being simultaneously transported downstream through the communication mediums without interfering with each other.

Each of the potentially supportable feeds 14, 16, 18 may be assigned to a particular one of the intervals depending on a mapping strategy, licensing strategy or other operational requirements. The frequencies of each feed 14, 16, 18 may be determined by an originator of the corresponding input signal 44. The signal processor 12 may identify the originator from additional information received with the corresponding input signal 44 in order to facilitate identifying which portion of the mapping table 90 has been allocated to support signal transmissions of that originator. A first interval of the downstream frequency spectrum ranging from 690-770 MHz has been allocated to support signaling associated with the originator of the first feed 14. A second interval the downstream frequency spectrum ranging from 770-850 MHz has been allocated support signaling associated with the originator of the second feed 16. The corresponding intervals of the downstream frequency spectrum allocated to the other feeds 18 as shown with reference to one of the illustrated F3, F4, F5, F6, F7, F8 and F9 designations.

When processing the first feed 14, the converter devices 80, 82, 84, 86 assigned to facilitate conversion of each corresponding signal part 54, 56, 58, 60 may be configured to select four different output frequencies from within the corresponding interval of the selection map, i.e., within 690-770 MHz. The particular frequency selected for each converter 80, 82, 84, 86 from within the 690-770 MHz interval may be determined in order to maximize a center frequency spacing, e.g., the first frequency (F1) may correspond with 710 MHz, the second frequency (F2) may correspond with 730 MHz, the third frequency (F3) may correspond with 750 MHz and the fourth frequency (F4) may correspond with 770 MHz. The intervals in the selection map 90 may be tailored to the particular center frequency offset in order to facilitate desired frequency spacing, which for exemplary non-limiting purposes has been selected to correspond with 20 MHz. The signal processor 12 may include a separate set of devices to support simultaneous transmission of the second feed 16 whereby the corresponding converters may be configured to output the signal parts associated with the second feed at 790 MHz, 810 MHz, 830 MHz and 850 MHz. (The devices used to support the additional feeds are not shown however they would duplicate the devices illustrated in FIG. 2 with additional duplicates optionally being included to support additional feeds.)

The signal processor 12 may include a combiner 92 configured to receive the signal parts 54, 56, 58, 60 from the converter devices 80, 82, 84, 86 as well as other signal processors as described here or from other processors from other services carried over the CATV networks. The combiner 92 may be configured to aggregate the received frequency diverse signals for transport over the communication medium 34. The combiner 92 may be configured to prepare the received first, second, third and fourth signal parts 54, 56, 58, 60 for transmission to a laser transmitter (see optical transmitter/receiver (opt. Tx/Rx) in FIG. 1) to facilitate subsequent modulation over an optical medium and/or for transmission directly to a hybrid fiber coaxial (HFC) or other wired communication medium 34. The laser transmitter may be configured to receive the signaling (h11, h22, h33, h44) from the combiner 92 as a single/common input to be subsequently modulated for transport over one or more of the fibers and/or coax portions of the communication medium 34. The communication medium 34 may be used to facilitate long-haul transport of the signal parts 54, 56, 58, 60 for subsequent receipt at the first end station 22. This type of long-haul transport of frequency diverse signaling, derive from processing the non-frequency diverse signaling received at the input 44 to the signal processor, may be helpful in maximizing signaling throughput.

The second signal processor 48 may include a processor, a plurality of down-converter devices, a plurality of OFDM processing devices or alternative multicarrier or single carrier processing devices, a plurality of modulation de-mapping devices and a codeword de-multiplexing device. These devices may be configured to facilitate inverse operations to those described above with respect to the signal processor 12 in order to facilitate generating the output signal 46. While the signal processors 12, 48 are described with respect to including various devices to facilitate the contemplated signal transmission, the signal processors 12, 48 may include other electronics, hardware, features, processors, or any other sufficient type of infrastructure having capabilities sufficient to achieve the contemplated signal manipulation. The first end station 22, in particular, may include an output port or other interface to facilitate communication of the output signal 46 to the first UE 38. In this manner, the communication system 10 may be configured to facilitate wireline signaling between the signal processor 12 and the first end station 22. FIG. 2 describes signaling corresponding with a downstream direction for exemplary purposes as an equivalent but inverse set of components going in the uplink direction may be included to facilitate similar processes in a reverse or inverse order to facilitate upstream signaling.

Figure 4A:
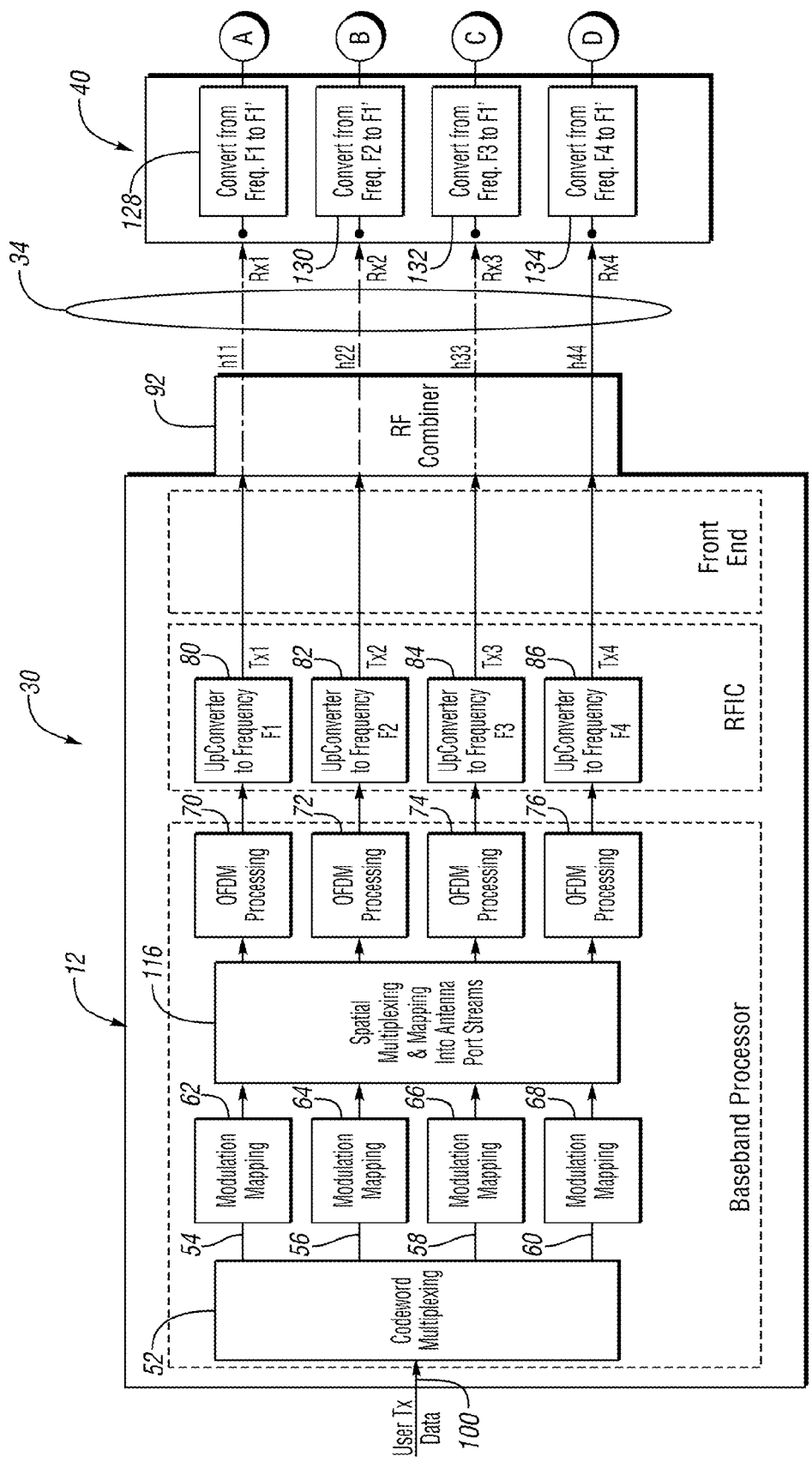
FIGS. 4a-4b schematically illustrate operation of the communication system when facilitating a wireless signaling mode in accordance with one non-limiting aspect of the present invention.
Figure 4B:
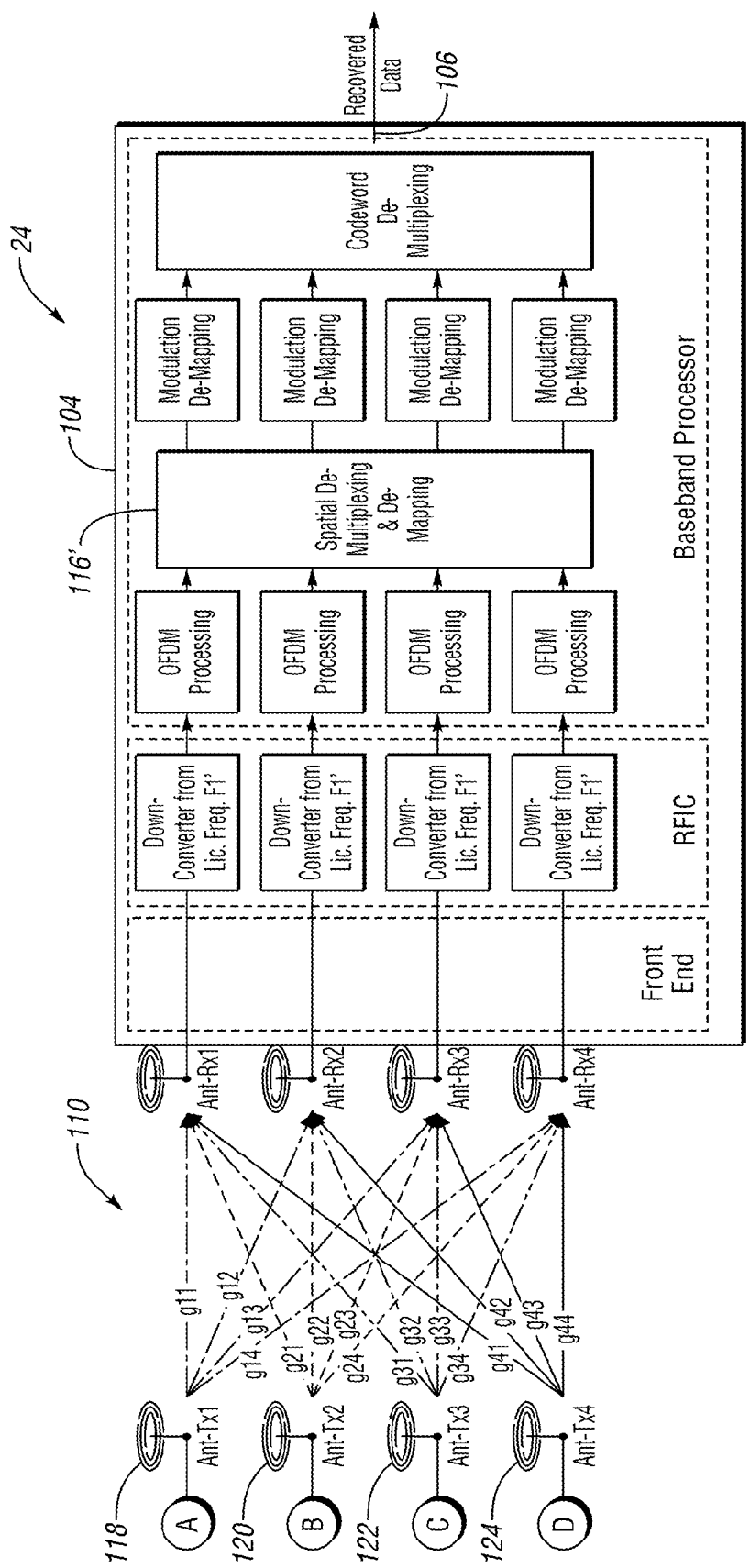

FIGS. 4a-4b schematically illustrate operation of the communication system 10 when facilitating wireless signal in accordance with one non-limiting aspect of the present invention. The wireless signaling may be similar to the signaling described with respect to FIG. 2 in that an input signal 100 received at the first signal processor 12 is converted to an intermediary signal (combined into a single/common output to laser transmitter, which is shown for exemplary purposes as having four equivalent parts—h11, h22, h33, h44) for transmission to a second signal processor 104 for conversion to an output signal 106. The illustration associated with FIG. 4 differs from that in FIG. 2 at least in that the intermediary signal traverses at least part of the distance between the first and second signal processors 12, 104 through a wireless medium 110. In particular, FIG. 4 illustrates a scenario where the intermediary signal is transmitted initially through the wireline communication medium 34 and thereafter through the wireless communication medium 110, which may correspond with a signal traveling from the headend unit 30 through the third end station 40 for wireless receipt at the second end station 24 (see FIG. 1).

The configuration shown in FIG. 4 may have many uses and applications, including supporting cellular telephone services, or other services that are at least partially dependent on wireless or RF signaling, such as where a provider desires to obtain certain benefits associated with transporting signaling at least partially through the wireline communication medium 34. The ability to at least partially rely on the wireline communication medium 34 may be beneficial in facilitating long-haul transport of the corresponding signaling (intermediary signal) in a manner that maximizes throughput and minimizes interference or other signaling loss that may otherwise occur if transmitted solely through wireless mediums.

The third end station 40 may be included between the first and second end stations 22, 24 to facilitate interfacing the wireline communication medium 34 with the wireless communication medium 110. Optionally, the third end station 40 may be positioned as close to the second end station 24 as possible in order to maximize use of the wireline communication medium 34 and/or the third end station 40 may be included as part of the first end station 22 in order to maximize wireless communication.

The first and second signal processors 12, 104 shown in FIG. 4 may be configured similarly to the corresponding signal processors shown in FIG. 2. The elements illustrated in FIG. 4 with the same reference numerals, unless otherwise noted, may be configured to perform in the same manner as those described above with respect to FIG. 2. The first and second signal processors 12, 104 of FIG. 4 may include an additional device to facilitate supporting the at least partial wireless communication, which is referred to as a spatial multiplexing and mapping device 116 and its corresponding inverse 116'. The spatial multiplexing device 116 may be configured to facilitate spatial diversity of the signal parts output from the modulation mapping devices 62, 64, 66, 68. The spatial multiplexing and mapping device 116 may be configured to add delay to one or more of the signal parts 54, 56, 58, 60 or modify these signal parts in different ways in order to facilitate spatially separating each signal part 54, 56, 58, 60 from one another. This may be beneficial in order to enhance the spatial diversity of antennas 118, 120, 122, 124, which may be individually used to transmit the signal parts 54, 56, 58, 60.

The third end station 40 may be configured to receive the frequency diverse signaling output from the combiner 92. The third end station 40 may include converter devices 128, 130, 132, 134 or additional features sufficient to facilitate converting the received frequency diverse signaling to spatially diverse signaling. The third end station 40 may include one converter device 128, 130, 132, 134 for each of the received signal parts, i.e., a first converter 128 for the first signal part 54, a second converter 130 for the second signal part 56, a third converter 132 for the third signal part 58 and a fourth converter 134 for the fourth signal part 60. Each converter 128, 130, 132, 134 may be configured to convert the frequency of the received signal part to a common frequency in order to translate frequency diversity over medium 34 to spatial diversity over medium 110. The common frequency may correspond with a frequency licensed by an originator of the input signal 100, e.g., wireless frequency ranges purchased by cell phone service providers and/or another frequency range otherwise designated to be sufficient to facilitate subsequent wireless transmission to the second end station 24. The second end station 24 may include a separate antenna and separate active converter devices for each of the spatially diverse signal it receives in order to facilitate spatially receiving the signal parts to the second UE. FIG. 4 describes signaling corresponding with a downstream direction for exemplary purposes as an equivalent but inverse set of components going in the uplink direction may be included to facilitate similar processes in a reverse or inverse order to facilitate upstream signaling.

Figure 5A:
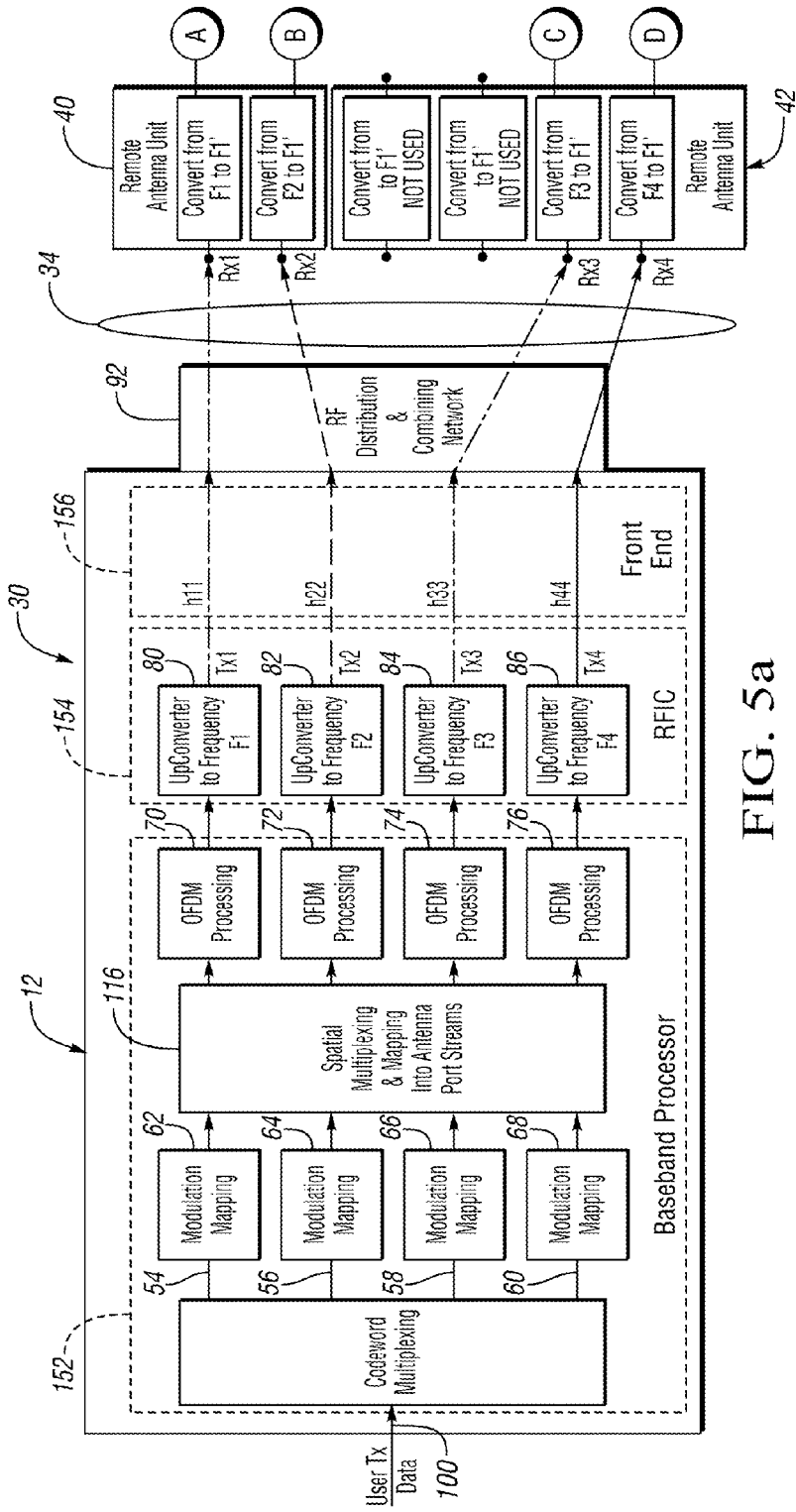
FIG. 5a-5b schematically illustrates operation of the communication system when facilitating wireless signaling having enhanced spatial diversity in accordance with one non-limiting aspect of the present invention.
Figure 5B:
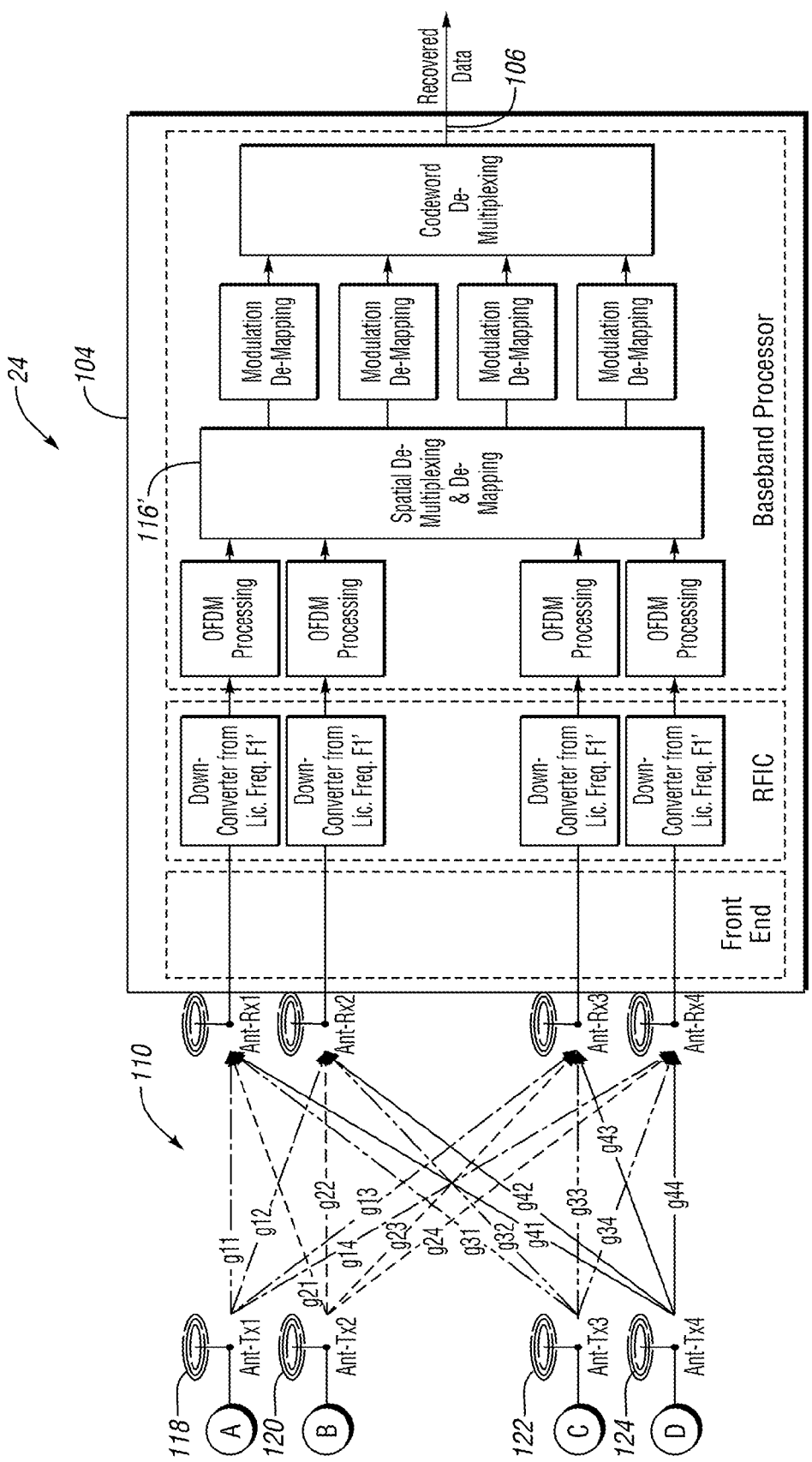

FIGS. 5a-5b schematically illustrates operation of the communication system 10 when facilitating wireless signaling having enhanced spatial diversity in accordance with one non-limiting aspect of the present invention. The wireless signaling may be similar to the signaling described with respect to FIGS. 2 and 4 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 5 differs from that in FIG. 4 at least in that the intermediary signal traverses at least part of the distance between the first and second signal processors 12, 104 through the wireless medium 110 by way of two remote antenna units instead of one, the selection and operation of which may be determined in the manner described in U.S. patent application Ser. No. 14/181,645, entitled Multiple-Input-Multiple-Output (MIMO) Communication System, filed Feb. 15, 2014, the disclosure of which is hereby incorporated by reference in its entirety. FIG. 5 illustrates a scenario where the intermediary signal is transmitted initially through the wireline communication medium 34 and thereafter through the wireless communication medium 110, which may correspond with signaling traveling from the headend unit 30 through the third end station 40 and the fourth end station 42 for wireless receipt at the second end station 24 (see FIG. 1). FIG. 5 provides enhanced spatial diversity for the wireless signals due to the third end station 40 being at a location physical different from or spatially distinct from the fourth end station 42.

One non-limiting aspect of the present invention contemplates the third and fourth end stations 40,42 being physically spaced apart in order to enhance the spatial diversity of the wireless signals transmitted therefrom, at least in comparison to the wireless signaling shown in FIG. 4 to be transmitted solely from the third end station 40. The fourth end station 42 is shown to be connected to a different trunk, cable, fiber line, etc. than the third end station 40 in order to demonstrate the ability of the signal processor 12 to transmit signals to the second end station 24 using multiple, frequency diverse portions of the wired communication medium 34. The signal processor 12 may be configured to select from any number of end stations when determining the two or more end stations desired to communicate wireless signaling with the second end station. The two or more end stations may optionally included another end station that may be closer to the second end station and/or connected to the same trunk or feed, such as but not limited to a fifth end station 140 (see FIG. 1). In this manner, the signaling desired for receipt at the second end station may commonly originate from the signal processor and thereafter traverse different portions of the wired communication medium 34 and the wireless communication medium 110 prior to being re-joined and commonly received at the second end station 24. FIG. 5 describes signaling corresponding with a downstream direction for exemplary purposes as an equivalent but inverse set of components going in the uplink direction may be included to facilitate similar processes in a reverse or inverse order to facilitate upstream signaling.

Figure 6A:
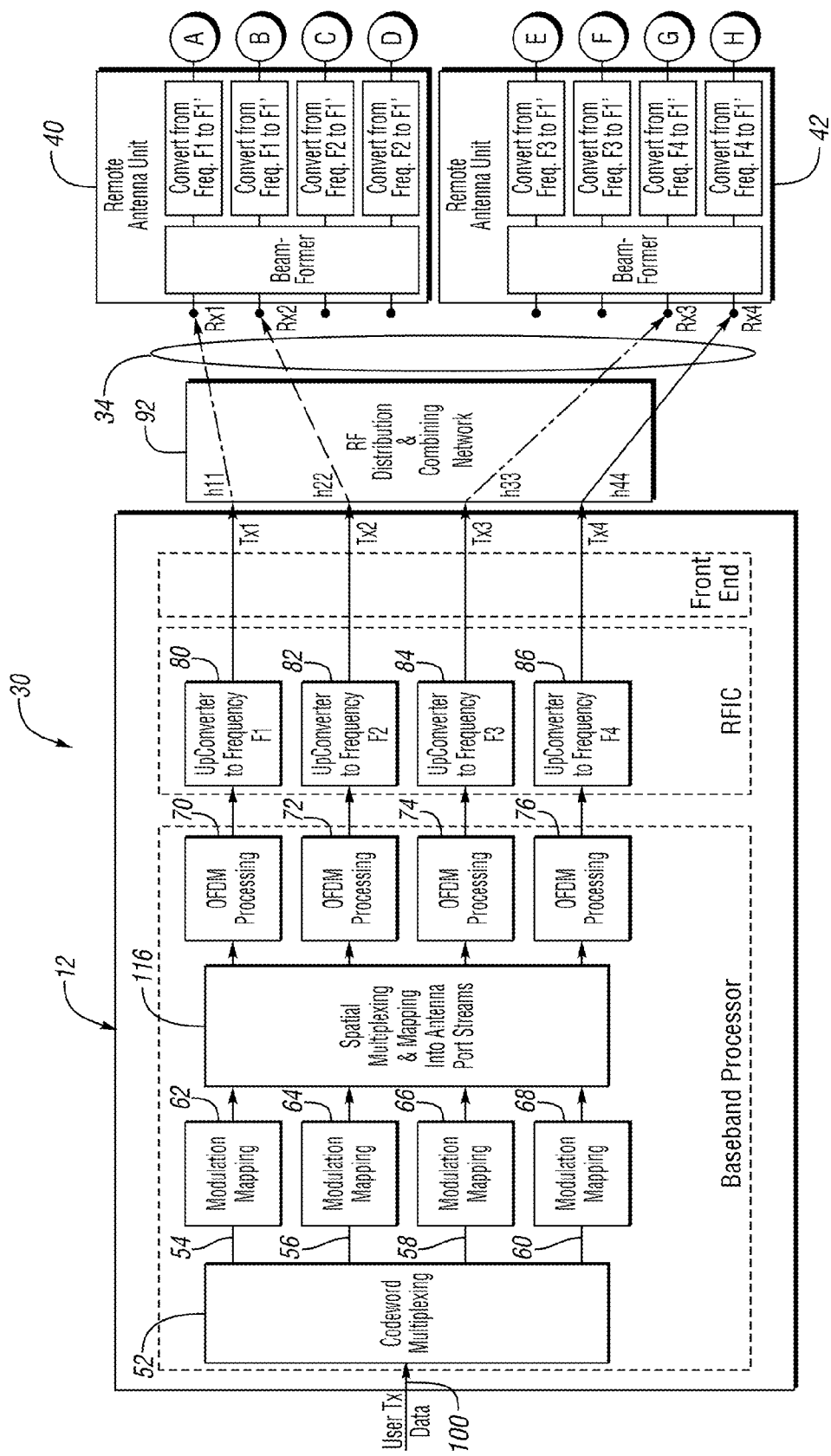
FIG. 6a-6b schematically illustrates operation of the communication system when facilitating wireless signaling having enhanced spatial diversity in accordance with one non-limiting aspect of the present invention.
Figure 6B:
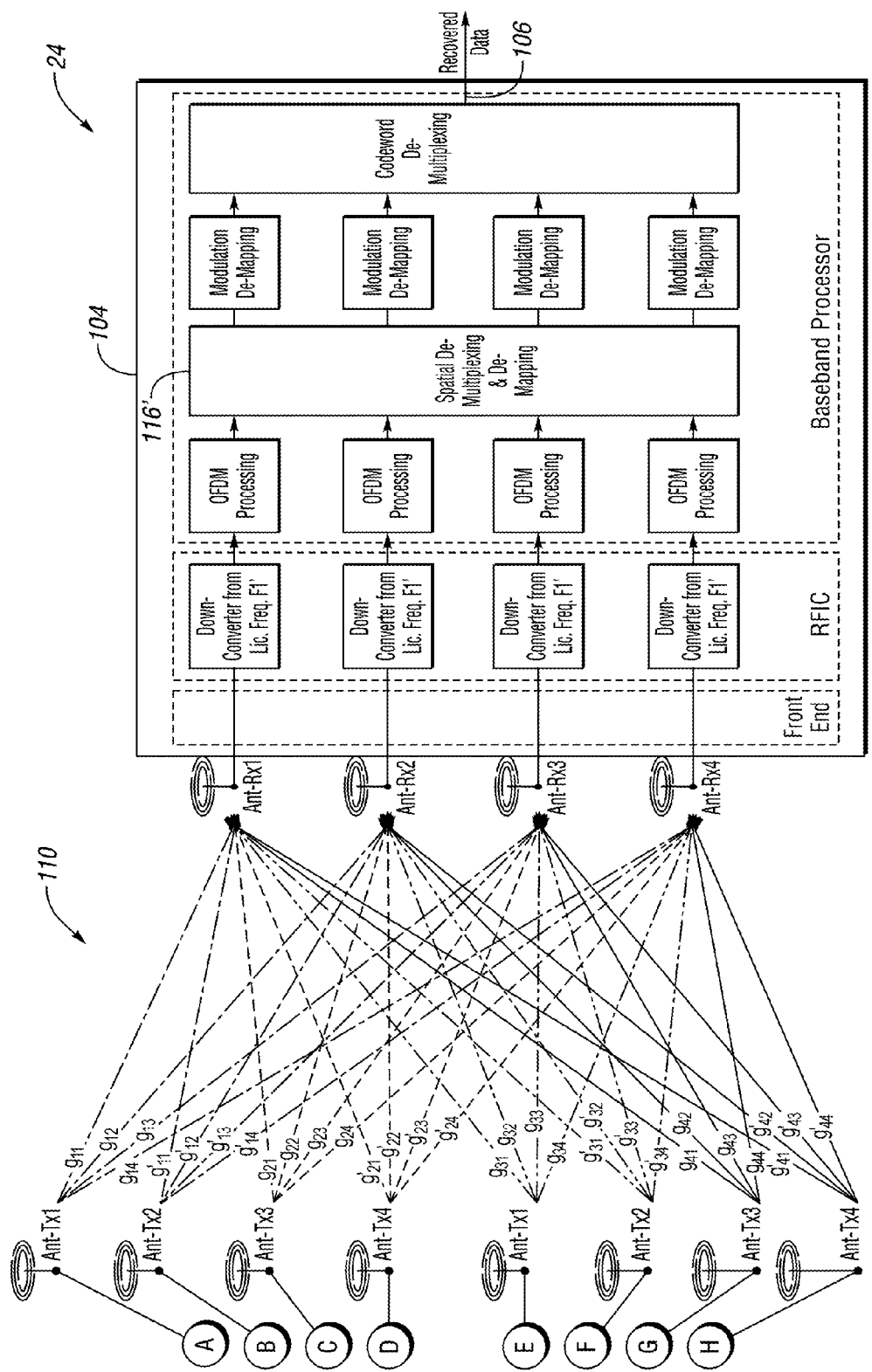

FIGS. 6a-6b schematically illustrates operation of the communication system 10 when facilitating wireless signaling having enhanced spatial diversity with beamforming in accordance with one non-limiting aspect of the present invention. The wireless signaling may be similar to the signaling described with respect to FIGS. 2, 4 and 5 at least in that the input signal 100 received at the first signal processor 12 is converted to an intermediary signal (combined into a single/common output to laser transmitter shown for exemplary purposes as having four equivalent parts—h11, h22, h33, h44) for transmission to the second signal processor 104 where it is then converted to the output signal 106. The illustration associated with FIG. 6 differs from that in FIG. 5 at least in that the intermediary signal traverses at least part of the distance between the first and second signal processors 12, 104 through the wireless medium 110 using beamforming. FIG. 6 illustrates a scenario where the intermediary signal received at each of the first and second end stations 40, 42 is replicated with beamformers such that duplicate signals are output to addition ports for use in transmitting four wireless signals. The additional wireless signals may be replicated with phase, delay or amplitude adjustments sufficient to facilitate beamforming. FIG. 6 describes signaling corresponding with a downstream direction for exemplary purposes as an equivalent but inverse set of components going in the uplink direction may be included to facilitate similar processes in a reverse or inverse order to facilitate upstream signaling.

The signal processor 12 may be configured to facilitate MIMO related signaling by processing an input signal into multiple, frequency diverse signals (e.g., h11, h22, h33, h44) particularly suitable for transmission over an HFC infrastructure. Following transmission over the HFC infrastructure, the signals may optionally be processed for further wireless transport, such as by converting the frequency diverse, MIMO related signals to a common frequency prior to facilitating wireless transmission. Spatial diversity may be facilitated on the frequency converted signals sharing the common frequency by adding delay and/or other adjustments and transformations, i.e., signals carried over the HFC infrastructure, and/or by directing different portions of the MIMO signals derived from the same input signal to different, spatially diverse remote antenna units 40, 42 before wireless transport. Optionally, the frequency diverse, MIMO signals may be transmitted to different types of remote antenna units or remote antenna units having different transmission capabilities, e.g., FIG. 5 illustrates the third and station 40 having two converters and two antenna ports and the fourth end station 42 having four converters and four antenna ports.

The remote antenna units 40, 42, or more particularly the converters associated therewith, may be configured to convert received signaling for transport over corresponding antennas ports. Each antenna port may be configured to transmit one of the converted, MIMO signals (h11, h22, h33, h44), effectively resulting in transmission of multiple signals, e.g., signal h11 effectively produces multiple signals g11, g12, g13, g14 due to signal h11 being received at multiple antenna ports included on the receiving user equipment 24. The remote antenna units 40, 42 may be configured to simultaneously emit multiple MIMO signals, such as MIMO signals associated with different feeds and/or MIMO signals intended for receipt at other usual equipment besides the illustrated user equipment 24. The remote antenna units 40, 42 may include capability sufficient to facilitate beamforming or otherwise shaping wireless signals emitted therefrom, such as to in a manner that prevents the beams from overlapping with each other or unduly interfering with other transmitted signaling. The beamforming may be implemented using multiple antenna arrays or selection of antennas ports associated with each of the illustrated antennas, such as according to the processes and teachings associated with U.S. patent application Ser. No. 13/922,595, the disclosure of which is hereby incorporated by reference in its entirety.

Figure 7:
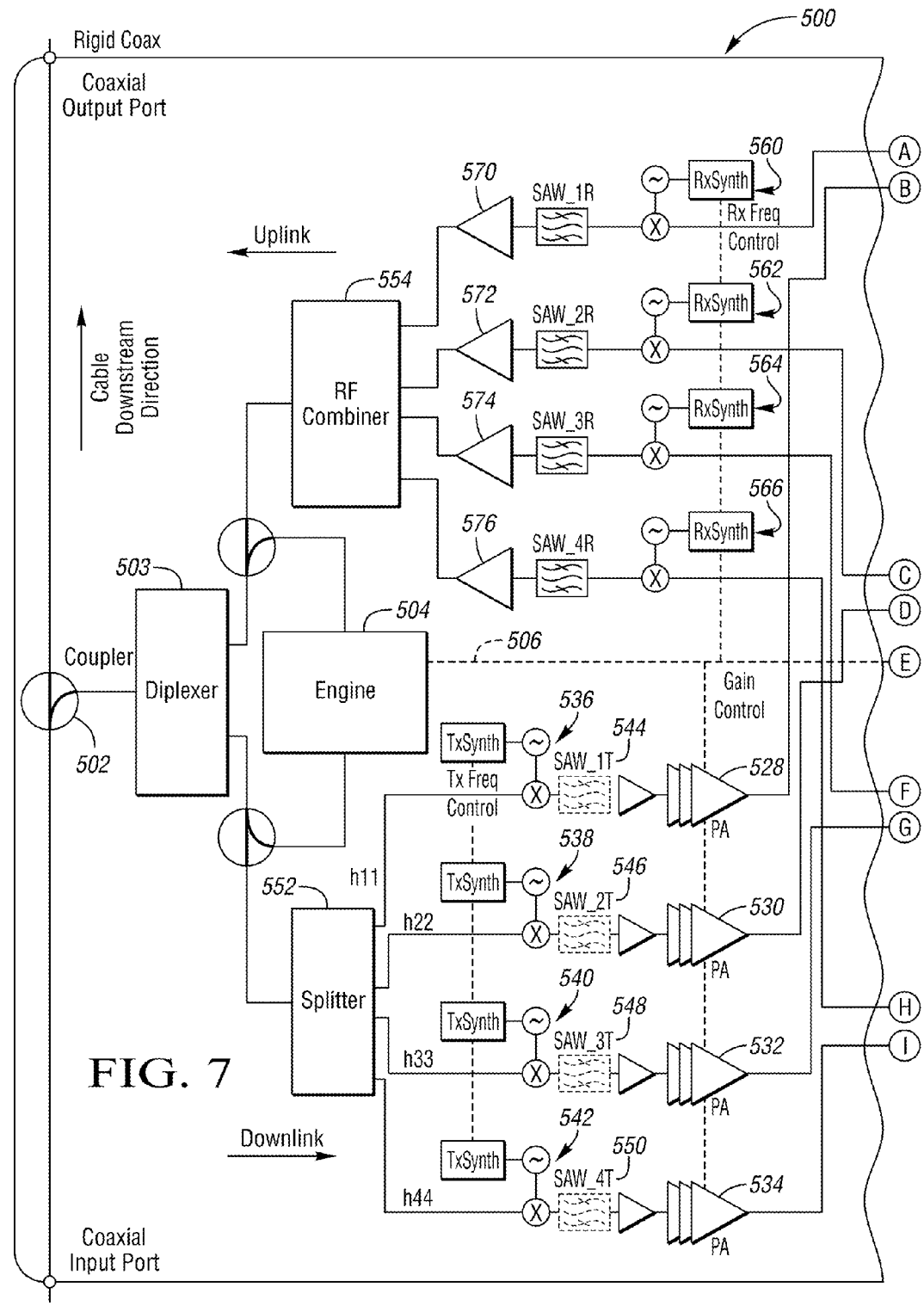
FIG. 7 illustrates a remote antenna unit accordance with one non-limiting aspect of the present invention.
Figure 7:
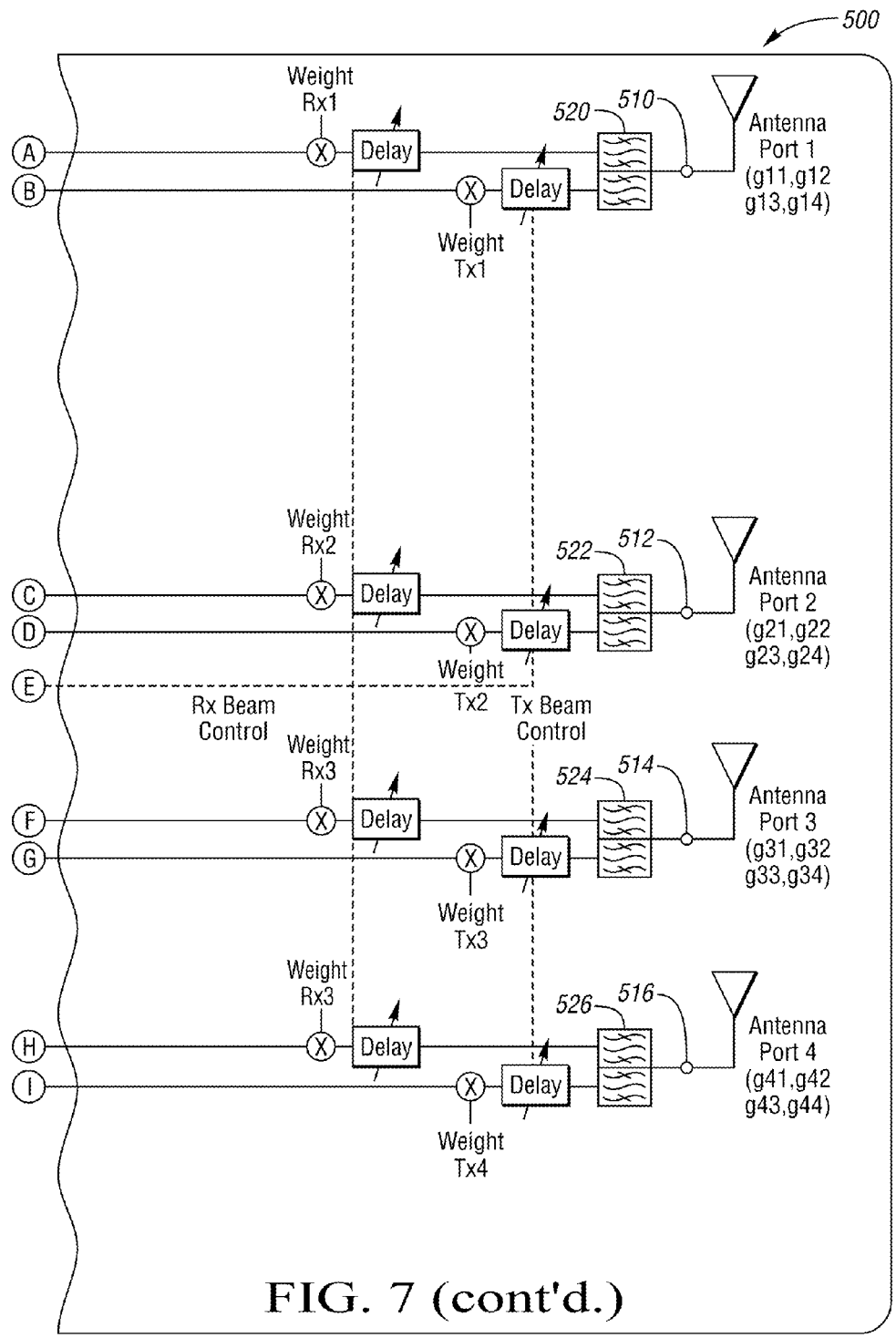

FIG. 7 illustrates a remote antenna unit 500 in accordance with one non-limiting aspect of the present invention. The remote antenna unit 500 may correspond with one of the end stations having capabilities sufficient to facilitate continued wireless signaling with another end station, user equipment (UE) or wireless device, e.g., the third end station 40 and the fourth end station 42. The remote antenna unit 500 may be configured to provide a transition between wireline/cable medium related signaling and wireless medium related signaling using an antenna equipped intelligent transceiver system. The remote antenna unit 500 may be configured to enable the provisioning of converged wireline and wireless services as well as traditional wireless services. This remote antenna unit 500, at least when compared to a remote radio head, may have a low complexity and enable the extension of the wireless distribution network reach in a similar fashion to a radio access network (RAN). The remote antenna unit 500 may include a coupler 502 configured to receive the intermediary wired signaling (i.e., signaling intended to be subsequently converted to wireless signaling) using a connection to the wired communication medium 34. A diplexer 503 may be configured to facilitate signal selection and guidance based on frequency, such as to differentiate uplink and downlink signal.

The coupler 502 may be used to enable transporting a portion of the intermediary signals to other components within the remote antenna unit 500. These intermediary signals may be processed further in the remote antenna unit 50 by frequency shifting, and by adjusting the amplitude, delay or phase of the signal prior to wirelessly transmitting these signal out of the antenna ports. This represents minor RF processing compared to the processing that takes places in traditional remote antenna units where the digitized RF signal is transported using baseband optics (i.e. via the high bandwidth of a common public radio interface (CPRI)). While the use of digitized intermediate RF signaling is contemplated, the use of RF signaling may be beneficial in enabling or maintaining use of existing pro-RF features and devices, such as but not necessarily limited to those employed in HFC/cable networks. The remote antenna unit 500 may include an intelligent device 504, which for exemplary non-limiting purposes is labeled as an engine, capable of detecting the uplink and downlink paths and the corresponding signaling, optionally in the manner that a cable UE would. The engine 504 may be configured to sniff location and other pertinent information to calculate antenna illumination parameters or other included instruction sufficient to facilitate controlling the remote antenna unit 500 to transmit the wireless signaling. Optionally, additional beamforming control information such as beamwidth, desired beam and null direction information or power level may be determined to achieve intended performance for the transmitted wireless signaling. A control link (bus) 506 from the engine 506 to various controllable elements of the remote antenna unit 500 may be used to facilitate communication instructions or otherwise controlling operations associated therewith.

At least some of the controllable aspects of the remote antenna unit 500 are labeled as transmit (Tx) frequency (freq) control, gain control, Rx beam control, Tx beam control and Rx freq control. Each of these controllable features may be controlled with the engine 504 as a function information recovered from the intermediary signaling (signaling over the wireline medium 34) and/or transmitted thereto from the signal processor 12 and/or master controller 20. The engine 504 may operate in this manner to facilitate implementing the various signal manipulations contemplated by the present invention to facilitate interfacing between the wireless medium 110 and the wired medium 34. The engine 504 may dynamically vary the related controls according to a current network MAP or other operational constraints, optionally in a manner sufficient to achieve essentially real-time adjustments necessary to facilitate interface multiple feeds and/or signaling through a plurality of antenna ports 510, 512, 514, 516. The MAP information may correspond with that described in U.S. patent application Ser. No. 12/954,079, entitled Method and System Operable to Facilitate Signal Transport Over a Network, the disclosure of which is hereby Incorporated by reference in its entirety. Four antenna ports 510, 512, 514, 516 may be associated with a single antenna element (the number of antenna elements and antenna ports for a particular antenna may vary) to facilitate 4×4 MIMO communications for exemplary, non-limiting purpose as more or less antenna ports 510, 512, 514, 516 may be utilized without deviating from the scope and contemplation of the present invention.

One non-limiting aspect of the present invention contemplates a scenario where the remote antenna unit 500 is located in a coaxial segment extending directly from an optical node (e.g., without actives or taps in between), and thereby, enabling frequencies used for upstream and downstream in the wired network above 1 GHz frequency range. The frequency range from 1 GHz to 3 GHz may used with the benefit of avoiding consumption of the spectrum resources that may be allocated to cable services and other applications required to operate below 1 GHz. Optionally, the use of signaling within the 1-3 GHz range may be enabled across the network if the existing active devices, i.e. amplifiers are by-passed by amplifiers and filters that enable the transmission channels that the system is using above 1 GHz. The coupler 502 attachment to a rigid coaxial section of the HFC network 34 may be beneficial in minimizing attenuation to the closest active node, which may be a nearby optical node, and thereby facilitating use of the 1-3+GHz range. If a relatively low number of remote antenna units 500 are operating in the 1-3 GHz are needed, special high gain amplifiers can be used and located in a coaxial segment directly connected to the optical node without unduly increasing system costs.

The remote antenna unit 500 may consist of amplified, filtered and/or frequency shifted downlink and uplink data paths. Duplexers 520, 522, 524, 526 may be used close to the antenna ports 510, 512, 514, 516 to connect both (UL & DL) direction paths to the same antenna element (separate antenna ports are shown as being part of the same antenna element). Beamforming components (labeled as weighted Rxn and Txn which modify the signal using RF mixers and corresponding signal delay controls) may be used at the antenna ports 510, 512, 514, 516 to facilitate implementing the contemplated adjustable delay components for beam steering and weighting factor multiplier control elements for shaping beam and nulls. The weights or multiplication factors and the delays may be used to shape the radiation pattern so that most of the energy (main beam) concentrates towards the intended target and minimum radiation energy or nulls are directed towards the interference sources. The delays may be individually adjusted on the signals traversing each antenna element such that the wireless signals add constructively (in-phase) when they reach the intended target. The weighting or multiplication factors contribute to the shaping of the beam and minimization of the energy in unwanted directions. The remote antenna unit 500 may be frequency agile such that the wireless operating frequency can be adjusted to the corresponding licensed spectrum, i.e., the spectrum authorized for use at or from the each of the remote antenna units 500 (some antennas may leverage licenses for different spectrum uses and/or the spectrum usage may correspond with that configured to the wireless devices receiving the transmitted wireless signaling—shown to be emitted as h11, h22, h33, h44 and effectively received as g11, g12, h13, g14, etc.). A gain control mechanism, optionally including a plurality of fixed or controllable amplifiers 528, 530, 532, 534, may be included to help in dense operating scenarios to limit interference to other RF remote antennas, such as by increasing or decreasing signal power levels according to beamforming parameters or non-beamforming parameters (e.g., to prevent/limit interference when omnidirectional or fixed-direction antennas are used).

The gain control mechanism may be controlled as a function of commands transmitted from the engine 504 to the corresponding amplifiers 528, 530, 532, 534. The signal processing preceding the gain control may be configured in accordance with the present invention to employ a frequency converter 536, 538, 540, 542 for each path (e.g., h11, h22, h33, h44) in order to facilitate converting the frequency diverse signals carried over the wireline medium 34 to signals having frequencies sufficient for transport over the wireless medium 110. The converters 536, 538, 540, 542 are shown to each include separate, independent oscillators, transmit synthesizers and RF mixers operable to enable conversion of multiple, independently placed data paths at different frequencies. Each of the local oscillators may be frequency locked to a master oscillator (not shown) to achieve frequency locking and enable the operation without guardbands on the HFC environment. The signals transported over the wireline medium 34 may be frequency diverse, at least in that the signals may be transmitted from a corresponding one of the signaling processor converters (e.g., 80, 82, 84, 86) and thereafter converted at the remote antenna unit 500 prior to transport (such as in the manner illustrated in FIG. 4 with respect to related converters 128, 130, 132, 134). The frequency converters 536, 538, 540, 542 may be independently controlled to output the signals h11, h22, h33, h44 at the same or different frequencies. In the case when MIMO and beamforming signals are directed to the same UE or end-device the converters 536, 538, 540, 542 output the signals at the same frequency. In MIMO, because the wireline signals are coming from different wireline channels, the mixing frequencies at the converters 536, 538, 540, 542 may be needed to be different in order to place the signals at the same frequency in the wireless domain. In beamforming the same wireline signal may be used in each antenna port 510, 512, 514, 516, in this case the same mixing frequencies can be used in each of the converters 536, 538, 540, 542. If h11, h22, h33 and h44 are to be output to the same UE, the output frequencies of each may be the same (FIG. 4), and if some of the signals are to be output to different UEs, then the output frequencies may vary according to the intended recipient (FIG. 5). Independent control of frequency allows for better use of resources as one remote antenna unit could be simultaneously be serving two end-devices but through different antenna ports.

The use of independent local oscillators may enable tuning to varying frequencies of the incoming signals (h11, h22, h33, h44), e.g., each oscillator may use different mixing frequency when converting to a common output frequency. Filters/amplifiers 544, 546, 548, 550 may be included for filtering signals before subsequent processing, such as to facilitate removing noise, interferences or other signal components before the signals are subsequently amplified and/or passed for further processing, e.g., to remove noise prior to being further propagated and/or magnified. The filters 544, 546, 548, 550 and subsequent gain controllers 528, 530, 532, 534 may be optional components that may be omitted and/or controlled to pass through signals without manipulation in the event the signals output from the converters 536, 538, 540, 542 have sufficient orthogonality to enable further, non-interfering or noise susceptible transport. Optionally, the filters 544, 546, 548, 550 may be tunable to convert the frequencies of incoming signals to desired frequencies. Optionally, the filters 544, 546, 548 and 550 may be eliminated sufficient orthogonality occurs across channels (e.g., h11, h22, h33, h44) to produce an interference free operation. Instead of frequency multiplexing the signals adjacent to each other, and thereby requiring sharp roll-off filtering, the separate oscillators 536, 538, 540, 542 may be used to maintain orthogonality by placing the subcarriers of different signals exactly an integer multiple of the subcarrier spacing. This may allow the placement of the orthogonal signal carriers without guardbands and/or the use of a filter(s).

A splitter 552 may be included to facilitate separating incoming signals prior to delivery to the appropriate one of the converters 536, 538, 540, 542. The splitter 552 may split signals to each of the converters when 4×4 MIMO is active. Splitter branches my be left unused when splitting signals to a lower number of branches. Only two of the converters 536, 538, 540, 542 are used when 2×2 MIMO is active. A different number of active branches may be used to split signals to any one or more of the converters 536, 538, 540, 542 depending on other desired operating parameters. The splitter 552 is shown to be separate from an RF combiner 554 included in the uplink path to combine and modulate signals for transport over the wired medium 34. The combiner 554 may operate as a function of signals received from the engine 504 to enable one or more signals to be combined for upstream transport. The upstream signals may correspond with wireless signals received at the antenna ports 510, 512, 514, 516 and then subsequently processed with separate converters 560, 562, 564, 566 and filters/amplifiers 570, 572, 574, 576 of uplink filtering and/or amplification (controllable with the engine 540 according to demands/configuration of the wired medium 34). The uplink converters 560, 562, 564, 566 may be configured similarly to the downlink converters 536, 538, 540, 542 with respect to including independently controllable synthesizers, oscillators and RF mixer. The engine 504 may control the converters 536, 538, 540, 542 to facilitate adding frequency diversity to the upstream traveling signals prior to transport over the wired medium 34. The engine 504 may essentially perform operations on the uplink that are the inverse of those performed on the downlink, including implementing related beamforming processing.

While four antenna ports 510, 512, 514, 516 are illustrated, the remote antenna unit 500 can be extended to a include more or less antenna ports 510, 512, 514, 516. The number of corresponding antennas elements may be selected to provide enough elements and the proper path control mechanisms to enable the use or one or more antenna elements exclusively for MIMO, exclusively for beamforming and/or a combination of both. The engine 504 may serve as an intelligent communication device that in addition to generating the beamforming parameters adjustable on a per Tx or Rx burst basis, can provide state information of the remote antenna unit 500, including enabling the antenna element delay and amplitude weighting components associated with steering beams and nulls as commanded. Optionally, these control messages can be carried out in-band in the wireless protocol from a central location, thereby avoiding a need to modify the existing wireless protocol. The remote antenna unit 500 may also include modulation conversion capabilities, such as when the wireline channel will support significantly higher order modulation than the wireless channel. This capability may be advantageous in facilitating decode/demodulate of the incoming wireless signal on the uplink and re-encode/re-modulate to a higher order modulation to save spectrum for downlink communications over the wired medium 34. The added complexity to the remote antenna unit 500 associated therewith may be offset by savings for plant (wired medium) spectrum. In a similar manner, spectral de-compression via higher order modulation could be used in the downlink when the wireline signal is lower bandwidth with high order modulation as it transits to the remote antenna unit 500. The remote antenna unit 500 may make the corresponding conversion to a wider bandwidth signal and/or with lower order modulation more suitable for the wireless medium before being transmitted wirelessly.

Figure 8:
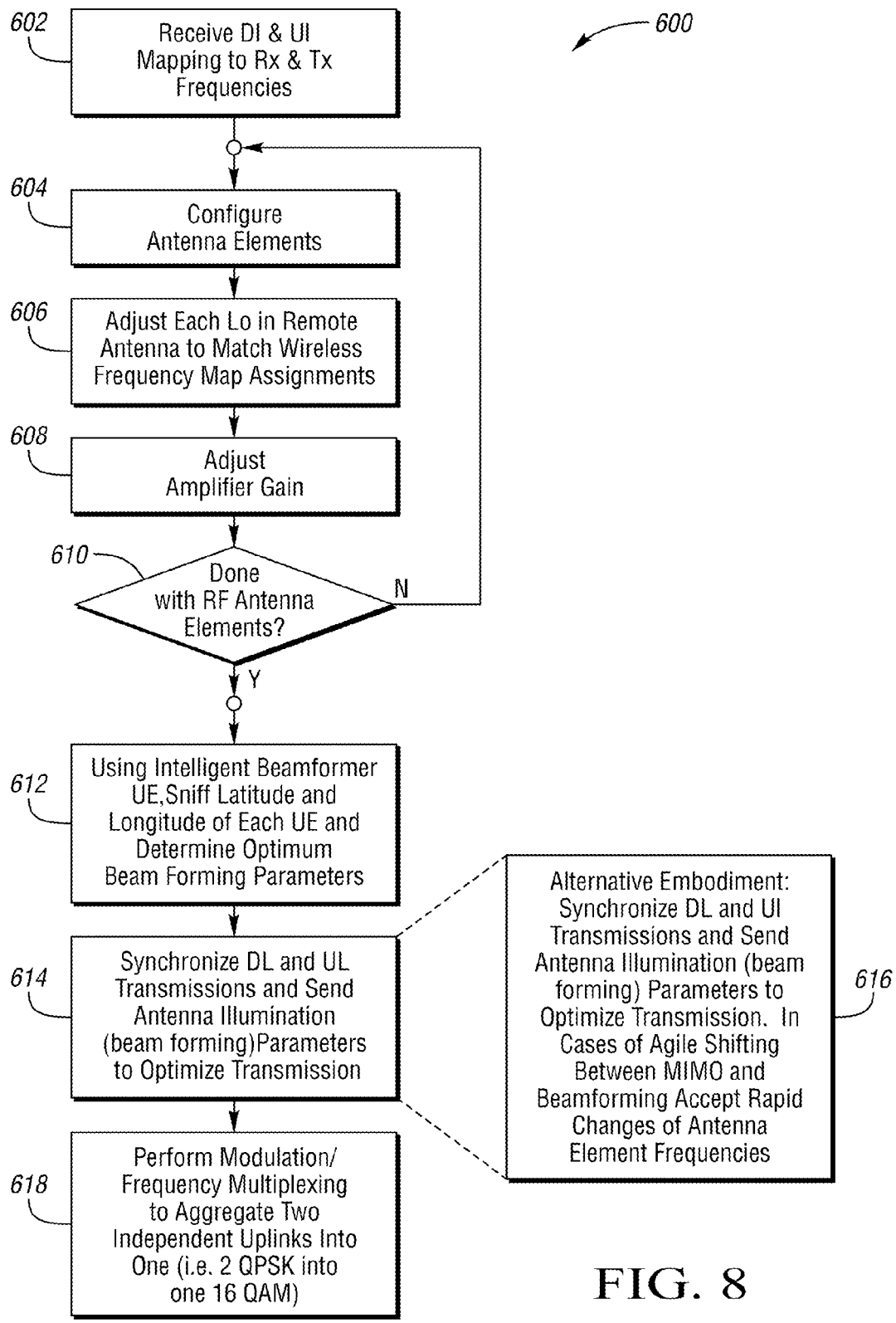
FIG. 8 illustrates a flowchart of a method for controlling a remote antenna unit to facilitate wireless signaling in accordance with one non-limiting aspect of the present invention.

FIG. 8 illustrates a flowchart 600 for a method of controlling a remote antenna unit to facilitate wireless signaling in accordance with one non-limiting aspect of the present invention. The method may be embodied in a non-transitory computer-readable medium, computer program product or other construct having computer-readable instructions, code, software, logic and the like. The instructions may be operable with an engine, processor or other logically executing device of the remote antenna and/or another one or more of the devices/components described herein to facilitate controlling the signaling processor and/or the other devices/components in the manner contemplated by the present invention to facilitate delivering wireless signaling (e.g., a master controller). The method is predominately described for exemplary non-limiting purpose with respect to at least a portion of the wireless signaling, or corresponding intermediary signaling, being long-hauled carried over a wired and/or wireline communication medium, such as but not necessarily limited to cable or hybrid-fiber coax (HFC) network. The long-haul or intermediary signaling may be facilitated with processing or other controls performed with the signal processor to provide wired transport over a greater distance than the eventual wireless signaling transport, thereby leverage off of the economies associated with centralized wired distribution system while also facilitating final interaction with wireless devices.

Block 602 relates to the engine receiving control parameters associated with processing to be performed on the uplink and downlink traveling signals. The control parameter may be determined by recovering related instructions from control signaling being carried over the wired medium 34. The control parameters are noted to include downlink (DL) and uplink (UL) receive (Rx) and transmit (Tx) frequencies. The Rx and Tx frequencies may specify frequencies or values for each converter of the remote antenna, typically with each oscillator (local oscillator (LO)) operating at a different frequency during 4×4 MIMO operation. The frequencies may be used to set various operating parameters for the converters, including frequency related settings for each of the synthesizers, oscillators and/or RF mixers. The frequencies may be designated in a MAP or other data set carried in signaling to the remote antenna and/or otherwise provided thereto. The MAP may specify frequencies that vary over time as a function of network traffic and/or spectrum licensed to UEs, optionally on a per oscillator basis or in any other manner suitable for enabling the engine to determine frequencies appropriate for each oscillator. The ability to set and vary the frequencies of each oscillator and/or the other frequency adjusting components in this manner may be beneficial in enabling remote antennas to facilitate wireless signaling with various types of devices and/or within the confines of different spectrum constraints.

Blocks 604 and 606 relates to configuring antenna elements and oscillators of the remote antenna unit. The configuration of the antenna elements may include assessing when each antenna is to be active and their corresponding operating characteristics and capabilities, e.g., beamforming support, transmission range, number of elements available for use, etc. The engine may determine the operating capabilities of the antennas and implement the related controls according to the scheduling specified within the MAP and/or otherwise associated with the signaling desired for wireless transport. The configuration of the antennas may be controlled and adjusted as the frequencies or other operational settings of the MAP change. The configuration of the oscillators may include adjusting/setting each of the oscillators to match wireless frequency MAP assignments. Block 608 relates to performing further adjustments to the remote antenna unit to facilitate the desired wireless signaling. The further adjustments may include adjusting parameters of the amplifiers and/or filters used to facilitate signal processing and transmission following frequency conversion performed with the oscillators. One such adjustment may include adjusting a gain of the amplifiers according to beamforming parameters, signaling range or other variables necessary to facilitate the desired wireless signaling.

Block 610 relates to determining whether all the components supporting modification (or illumination) corresponding to each of the antenna elements of the remote antenna unit have been configured. As multiple antennas may be configured to facilitate MIMO signaling, i.e. coordinated wireless transmission from multiple antennas of the remote antenna, each of the antennas associated therewith may need to be configured prior to instigating the related wireless signaling. Once the frequencies and/or gains are set for each antenna element and/or for each signal (e.g., h11, h22, h33, h44, etc.), Block 612 relates to assessing position, movement or other variable states of the UE intended to receive the wireless signaling and adjusting beamforming parameters or other settings associated with the wireless signaling to direct the wireless signaling towards a moving UE and/or to make other adjustments associated with achieving optimum beamforming parameters. The engine may be configured to uncover information regarding the UE from registration packets or other signaling exchanged with the UE, e.g., signaling associated with granting or assessing whether to grant the UE access to a wireless network of the remote antenna unit. Optionally, the engine may determine latitude and longitude values for the UE in order to assess its movement and/or position in order to ensure desired beamforming, i.e., that the beam is directed towards the UE. In the event the remote antenna unit lacks beamforming capabilities or is an omnidirectional device, Block 612 may relate to determining whether the UE is within wireless signaling range.

Block 614 relates to synchronizing downlink and uplink transmissions and updating antenna illumination parameters is necessary to optimize transmission. The synchronization may correspond with switching the antenna ports and/or other controllable settings of the remote antenna to transmit and/or receive wireless signaling according to scheduling information included within the MAP. In the event each antenna port is limited to facilitating one of uplink or downlink transmissions, the synchronization may correspond with coordinating use of antenna ports in order to facilitate MIMO signaling where multiple antenna ports may require synchronization in order to facilitate uplink/downlink signaling. The antenna illumination parameters may be updated as necessary to facilitate the uplink/downlink signaling, i.e., the illumination parameters may be set to facilitate downlink communication to a first UE and thereafter adjusted to facilitate uplink communication with a second, different UE. Block 616 relates to an optional process where information related to the synchronization and adjusted illumination parameters may be transmitted from the remote antenna to the master controller and/or signal processor. The transmission of such information may be beneficial in agile environments where UEs may be rapidly transitioning from one remote antenna to another such that the master controller and/or single processor may need to instruct another remote antenna to prepare and/or begin facilitate wireless signaling with such agile UEs in order to prevent a loss/disruption of service.

Block 618 relates to performing modulation/frequency multiplexing in order to aggregate received wireless signaling for uplink transmission. The multiplexing may correspond with the remote antenna preparing received wireless signaling for further wireline signaling. In the event the remote antenna is simultaneously receiving wireless signals from different UEs, Block 618 may relate to the remote antenna combining the associated signals into one uplink transmission, e.g., by combining two QPSK signals into a single 16 QAM signal. The remote antenna may include an RF combiner or other multiplexing device to facilitate multiplexing or otherwise facilitating processing associated with converting wireless related signaling for wireline transport. The remote antenna may schedule transmission of the uplink, wireline signaling according to parameters specified within the MAP. The uplink signal may be received at an associated signal processor and thereafter further processed for subsequent transport. In this manner, one non-limiting aspect of the present invention may be to leverage the capabilities of an HFC infrastructure to support long-haul, wireline transport of wireless originating signaling (signaling received at a remote antenna) and terminating signaling (signaling transmitted from a remote antenna).

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A multiple-input multiple-output (MIMO) remote antenna unit comprising:
    a splitter configured to separate an input signal into at least a first signal part, a second signal part, a third signal part and a fourth signal part, the first signal part being at a first frequency, the second signal part being at a second frequency, the third signal part being at a third frequency and the fourth signal part being at a fourth frequency, each of the first, second, third and fourth frequencies being different;
    a first converter, a second converter, a third converter and a fourth converter, each of the first, second, third and fourth converters being configured to convert a respective one of the first, second, third and fourth signal parts to a fifth frequency for subsequent wireless transport; and
    an engine configured to determine the fifth frequency as a function of frequency information transmitted over a wired communication medium carrying the input signal, the engine instructing each of the first, second, third and fourth converters to respectively convert the first, second, third and fourth signal parts to the fifth frequency.

2. The remote antenna unit of claim 1 wherein the first, second, third and fourth converters include one of a first oscillator, a second oscillator, a third oscillator and a fourth oscillator, each oscillator being independently controllable by the engine to operate at multiple frequencies.

3. The remote antenna unit of claim 2 wherein the engine controls each of the first, second, third and fourth oscillators to respectively operate at a sixth, seventh, eight and ninth frequency in order to facilitate converting the first, second, third and fourth signal parts to the fifth frequency.

4. The remote antenna unit of claim 1 further comprising a gain mechanism operable to amplify the first, second, third and fourth signal parts following conversion to the fifth frequency.

5. The remote antenna unit of claim 4 wherein the gain mechanism includes a first amplifier, a second amplifier, a third amplifier and a fourth amplifier for respectively amplifying the first, second, third and fourth signal parts, each amplifier being independently controllable to provide multiple amounts of amplification.

6. The remote antenna unit of claim 5 wherein the engine controls the amount of amplification provided by the first, second, third and fourth amplifiers such that the amplification provided by the first, second, third and fourth amplifiers periodically varies depending on instructions received from the engine.

7. The remote antenna of claim 1 further comprising a beamforming mechanism operable to facilitate steering a first beam, second beam, third beam and fourth beam transmitted from a respective one of a first antenna port, a second antenna port, a third antenna port and a fourth antenna port, each antenna port facilitating wireless transmission of a respective one of the first, second, third and fourth signal parts following conversion to the fifth frequency.

8. The remote antenna unit of claim 1 further comprising a first duplexer, a second duplexer, a third duplexer and a fourth duplexer respectively associated with one of the first, second, third and fourth antenna ports, each duplexer being configured to separate uplink and downlink traffic, the first, second, third and fourth signal parts being downlink traffic.

9. The remote antenna of claim 8 further comprising a fifth converter, a sixth converter, a seventh converter and an eighth converter, each of the fifth, sixth, seventh and eighth converters being configured to convert a respective one of a fifth, sixth, seventh and eighth signal part to one of a tenth, eleventh, twelfth and thirteenth frequency, the fifth, sixth, seventh and eighth signal parts being uplink traffic transported through a respective one of the first, second, third and fourth duplexers.

10. The remote antenna unit of claim 9 wherein the fifth, sixth, seventh and eighth converters include one of a fifth oscillator, a sixth oscillator, a seventh oscillator and a eighth oscillator, each oscillator being independently controllable by the engine to operate at multiple frequencies.

11. The remote antenna unit of claim 10 wherein the engine controls each of the fifth, sixth, seventh and eighth oscillators to respectively operate at the tenth, eleventh, twelfth and thirteenth frequencies in order to facilitate converting the first, second, third and fourth signal parts to a fourteenth frequency.

12. The remote antenna unit of claim 11 further comprising a fifth amplifier, a sixth amplifier, a seventh amplifier and a eighth amplifier for respectively amplifying the fifth, sixth, seventh and eighth signal parts following conversion to the fourteenth frequency, each amplifier being independently controllable by the engine to provide multiple amounts of amplification.

13. The remote antenna unit of claim 11 further comprising a combiner configured for combining the fifth, sixth, seventh and eighth signal parts following conversion to the fourteenth frequency.

14. The remote antenna unit of claim 1 wherein the engine sniffs a transmission MAP transmitted over the wired communication medium carrying the input signal, the transmission MAP including the frequency information.

15. A non-transitory computer-readable medium having a plurality of instructions operable with a processor to facilitate controlling a remote antenna unit to facilitate multiple-input multiple-output (MIMO) wireless signaling, the non-transitory computer-readable medium comprising instructions sufficient for:
    determining a transmission MAP being transmitted over a wired communication medium to facilitate transporting an input signal, the input signaling being carried over the wired communication as at least a first signal part, a second signal part, a third signal part and a fourth signal part, the first signal part being at a first frequency, the second signal part being at a second frequency, the third signal part being at a third frequency and the fourth signal part being at a fourth frequency, each of the first, second, third and fourth frequencies being different; and
    controlling a first converter, a second converter, a third converter and a fourth converter included as part of the remote antenna unit to convert a respective one of the first, second, third and fourth signal parts to a fifth frequency for subsequent MIMO wireless transport over a wireless communication medium according to parameters specified within the transmission MAP.

16. The non-transitory computer-readable medium of claim 15 further comprising instructions sufficient for independently controlling each of a first, a second, a third and a fourth oscillator to respectively operate at a sixth, seventh, eight and ninth frequency in order to facilitate converting the first, second, third and fourth signal parts to the fifth frequency according to the parameters specified in the transmission MAP.

17. The non-transitory computer-readable medium of claim 15 further comprising instructions sufficient for independently controlling amplification provided by each of a first, a second, a third and a fourth amplifier to respectively adjust gain of a corresponding one of the first, second, third and fourth signal parts following conversion to the fifth frequency according to parameters specified within the transmission MAP.

18. The non-transitory computer-readable medium of claim 15 further comprising instructions sufficient for controlling a beamforming mechanism operable to facilitate steering a first beam, second beam, third beam and fourth beam transmitted from a respective one of a first antenna port, a second antenna port, a third antenna port and a fourth antenna port, each antenna port facilitating wireless transmission of a respective one of the first, second, third and fourth signal parts following conversion to the fifth frequency.

19. A multiple-input multiple-output (MIMO) system comprising:
    a signal processor configured to separate an input signal into at least a first signal part and a second signal part for transport over a wired communication medium, the first signal part being at a first frequency and the second signal part being at a second frequency different than the first frequency; and
    a remote antenna unit configure to wireless transmit the at least first and second signal parts to a device over a wireless communication medium, the remote antenna unit including an engine configured to control a first converter and a second converter configured to convert a respective one of the first and second signal parts to a fifth frequency prior to transmission over the wireless communication medium according to parameters specified within a transmission MAP carried over the wired communication medium.

20. The system of claim 19 wherein the first and second converters include one of a first oscillator and a second oscillator, wherein the engine controls each of the first, second, third and fourth oscillators to respectively operate at a sixth, seventh, eight and ninth frequency in order to facilitate converting the first, second, third and fourth signal parts to the fifth frequency.

\* \* \* \* \*